United States Patent
Yanagisawa et al.

(10) Patent No.: US 6,181,517 B1
(45) Date of Patent: *Jan. 30, 2001

(54) MAGNETIC DISC DRIVE SYSTEM WITH LIQUID FILM LUBRICATING AGENT

(75) Inventors: Masahiro Yanagisawa; Akinobu Sato; Ken Ajiki, all of Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/577,546

(22) Filed: Dec. 22, 1995

(30) Foreign Application Priority Data

Dec. 26, 1994 (JP) .................................. 6-337312

(51) Int. Cl.[7] ........................................ G11B 5/60
(52) U.S. Cl. ................................. 360/235.4; 360/237
(58) Field of Search ............................ 360/103, 106, 360/104, 235.4, 237, 237.1; 428/65.4, 65.8, 694 BP, 694 R, 694 TP, 695

(56) References Cited

U.S. PATENT DOCUMENTS

| | | | |
|---|---|---|---|
| 2,969,435 | 1/1961 | Lynott | 179/100 |
| 3,005,675 | 10/1961 | Ledin et al. | 346/74 |
| 3,579,212 | 5/1971 | Gabor | 340/174 |
| 4,633,351 | 12/1986 | Bardos et al. | 360/102 |
| 4,757,402 | * 7/1988 | Mo | 360/103 |
| 4,819,091 | * 4/1989 | Brezocky et al. | 360/103 |
| 5,010,429 | * 4/1991 | Taguchi et al. | 360/103 |
| 5,202,803 | 4/1993 | Albrecht et al. | 360/97 |
| 5,327,310 | * 7/1994 | Bischoff et al. | 360/103 |
| 5,418,667 | * 5/1995 | Best et al. | 360/103 |
| 5,490,027 | * 2/1996 | Hamilton et al. | 360/104 |
| 5,557,488 | * 9/1996 | Hamilton et al. | 360/104 |

FOREIGN PATENT DOCUMENTS

| | | |
|---|---|---|
| 60-202534 | 10/1985 | (JP) . |
| 4-113568 | 4/1992 | (JP) . |
| 5-54578 | 3/1993 | (JP) . |
| 6-10868 | 2/1994 | (JP) . |
| 6-36489 | 2/1994 | (JP) . |
| 6-52645 | 2/1994 | (JP) . |
| 6-54539 | 7/1994 | (JP) . |
| 7-254248 | * 10/1995 | (JP) . |
| 61-104319 | * 6/1996 | (JP) . |
| WO9314495 | 7/1993 | (WO) . |

OTHER PUBLICATIONS

Mee et al, "Magnetic Recording Handbook: Technology and Applications", pp. 171–172, 1990.*

Harold Hamilton; "Contact Recording on Perpendicular Rigid Media"; 1991; pp. 483–490; Journal of the Magnetics Society of Japan vol. 15.

* cited by examiner

Primary Examiner—David Davis
(74) Attorney, Agent, or Firm—Hayes, Soloway, Hennessey, Grossman & Hage, PC

(57) ABSTRACT

A magnetic head slider in a magnetic disc drive system has a contact pad on a liquid bearing surface of the slider which bears on liquid applied on the magnetic disc. Each molecule of the liquid has at least two-polar groups for bridging the contact pad and the magnetic disc by intermolecular force. The bridging prevents the magnetic head slider from jumping over the magnetic disc.

12 Claims, 8 Drawing Sheets

MAGNETIC DISC DRIVE SYSTEM WITH LIQUID FILM LUBRICATING AGENT

BACKGROUND OF THE INVENTION (a) Field of the Invention:

The present invention relates to a magnetic disc drive system having a liquid bearing and, more particularly, to a magnetic disc drive system, having a liquid-bearing for a magnetic head slider, for use in a computer system.

(b) Description of Related Art:

Recently, the recording densities of various information storage drives have steadily increased. In a magnetic disc drive system, one important factor in increasing the recording density thereof is to decrease the spacing between a recording disc and a read/write magnetic head for reading and/or writing information stored on the recording disc.

To decrease the spacing, magnetic disc drive systems utilizing a liquid bearing in place of an air bearing have been proposed, for example, in patent publications JP-A-4(1992)-113568, U.S. Pat. No. 2,969,435, U.S. Pat. No. 3,005,675, U.S. Pat. No. 3,579,212, U.S. Pat. No. 4,633,351, and U.S. Pat. No. 5,202,803. In a magnetic disc drive system of this type, a magnetic head slider bears on a liquid bearing film to provide a spacing between a recording medium and a magnetic head, the spacing being substantially equal to the thickness of the liquid bearing film.

The thickness of such liquid bearing film is as low as about 20 nanometers (nm) and the surface roughness of the magnetic disc or the magnetic head slider can only be decreased down to a few nanometers, which is still one fifth the spacing. For this reason, the magnetic head slider cannot follow the magnetic disc well when the slider is moved at a linear speed greater than 10 m/sec relative to the magnetic disc. That is, it is difficult to prevent the magnetic head slider from jumping. In the disc drives disclosed in the Japanese and U.S. patent publications mentioned above, perfluoropolyethers having no polar functional groups, such as GALDEN D02 of Montefluos Co. and KRYTOX of Du Pont Co., are used.

Since such non-polar perfluoropolyethers do not provide sufficient interaction with the magnetic head slider or magnetic disc, jumping of the magnetic head slider cannot be prevented even when such non-polar perfluoropolyethers are used.

U.S. Pat. No. 5,202,803 discloses a perfluoropolyether having a single polar group made of DEMNUM SP of Daikin Industries, Ltd. and a hydrocarbon having a double bond such as POLY-1-DECENCE, both used for forming a liquid bearing.

Even when such liquids are used, jumping of the magnetic head slider cannot be avoided, because those liquids only have weak interaction with the magnetic head slider or the magnetic disc.

As is disclosed in patent publication No. JP-A-5(1993)-54578, it has been proposed to utilize the surface tension of a liquid lubricant layer and the pressure of the liquid lubricant formed on the uppermost layer of a magnetic disc to prevent the magnetic head and magnetic disc from contacting and to each other, and to thereby avoid breakage thereof and decrease the spacing therebetween.

In the disc drive disclosed in JP-A-5-54578, a perfluoropolyether having a polar terminal group is used for forming a liquid bearing, whereby the spacing between the magnetic head and the magnetic disc is maintained constant by the attractive force produced due to the surface tension and pressure of the liquid bearing.

In the case of a spherical slider having a radius of curvature (R) as disclosed in JP-A-5-54578, attractive force (F) due to surface tension (y) can be expressed by the following equation (1):

$$F = 4\pi R \cdot \gamma. \quad (1)$$

Equation (1) is shown in "Friction and Lubrication of Solid", presented by Bauden Teiber, p 285, 1961. As is apparent from equation (1), the attractive force (F) does not depend on the spacing (h).

That is, the attractive force (F) due to surface tension ($\gamma$) is not expressed as a function of spacing (h), so that the attractive force (F) does not produce the effect of preventing the spacing (h) from increasing, i.e., preventing jumping of the magnetic head slider. Moreover, the surface tension of a perfluoropolyether having a polar terminal group is small, and therefore insufficient to avoid jumping of the magnetic head slider.

Even when a non-polar perfluoropolyether such as GALDEN D02 or KRYTOX is used, only a small surface tension can be obtained. This is a common problem in using organic materials containing fluorine.

Contact type magnetic disc drives have been proposed in which the dimensions of the magnetic head slider and supporting member for supporting the magnetic head slider are decreased so as to reduce their weights, for example, in "Journal of the Magnetic of Japan", Vol. 15, Supplement No. S2 (1991), 483 presented by H. Hamilton and patent publication JP-A-5-508808.

In conventional air bearings, it has been proposed that two to four bearing surface pads be provided on the bearing surface of the magnetic head slider in order to obtain an air bearing.

JP-A-6-36486 discloses a magnetic head slider having two bearing surface pads arranged in the transverse direction of an air bearing surface. JP-A-6-52645 discloses a magnetic head slider having two bearing surface pads (leading pad) disposed near the leading side of the air bearing surface of the magnetic head slider and one bearing pad (trailing pad) disposed near the trailing side of the bearing surface.

JP-A-4-113568 discloses a magnetic disc drive using a liquid bearing in which four bearing pads are provided for the liquid bearing surface such that two of them are disposed near the leading side of the bearing surface and the remaining two are disposed near the trailing side of the bearing surface.

U.S. Pat. No. 5,202,803 discloses a magnetic head slider having two bearing surface pads disposed near the leading side of the air bearing surface and one bearing surface pad disposed near the trailing side. JP-A-5-54578, as mentioned above, discloses a magnetic head slider having a single bearig surface pad formed on the liquid bearing surface.

In JP-A-6-12808, it is proposed to use air bearing and liquid bearing in combination. In this case, two leading pads among three bearing surface pads are provided for air bearing and the remaining trailing pad is provided for liquid bearing.

In magnetic disc drives in which one to three bearing pads are provided for liquid bearing, however, jumping of the magnetic head slider cannot be avoided, because the attractive force of the liquid for attracting the bearing pads to the magnetic disc is weak.

In the magnetic disc drive disclosed in JP-A-4-113568, four bearing pads are provided for the liquid bearing such that two of them are disposed near the leading side of the bearing surface and the remaining two are disposed near the trailing side. The four pads, however, cannot contact the surface of the magnetic disc at the same time. Accordingly, jumping of the magnetic head cannot be also avoided by this configuration.

SUMMARY OF THE INVENTION

In view of the foregoing, it is an object of the present invention to provide a magnetic disc drive which can reduce jumping of a magnetic head slider on a magnetic disc and which has a high recording density and enhanced reliability.

According to a first aspect of the present invention there is provided a magnetic disc drive system comprising a magnetic disc, a read/write head for reading/writing information from and to the magnetic disc file, a magnetic head slider, having a bearing surface, for mounting the read/write head, a supporting member for supporting the magnetic head slider such that a load not more than 500 milligram-weight acts between the magnetic head slider and the magnetic head, the magnetic head slider having at least one contact pad on the bearing surface, the contact pad contacting the magnetic disc with intervention of a liquid, the liquid having at least two polar groups in each molecule of the liquid.

According to a second aspect of the present invention there is provided a magnetic disc drive system comprising a magnetic disc, a read/write head for reading/writing information from and to the magnetic disc file, a magnetic head slider, having a bearing surface, for mounting the read/write head, a supporting member for supporting the magnetic head slider such that a load not more than 500 milligram weight acts between the magnetic head slider and the magnetic head, the magnetic head slider having at least one contact pad on the bearing surface, the contact pad having a flat portion and a plurality of convex portions protruding from the flat portion, the contact pad contacting the magnetic disc with an intervention of a liquid.

In the magnetic disc drive system according to the first and second second aspects of the present invention, jumping of the magnetic head slider is prevented by the liquid having two or more polar groups in each molecule of the liquid and the contact pad having convex portions and a flat portion contacting the magnetic disc, respectively.

The term "contact pad" as used in this text means a pad having a portion which is considered to directly contact the surface of a magnetic disc without an intervention of a liquid bearing. In contrast, the term "bearing surface pad" as used heretofore means a pad which opposes the magnetic disc in a spaced relationship therewith. Both types of pads, however, have substantially no difference in terms of the structure and function.

The presence or absence of contact between the magnetic head slider and the bearing pad may be strictly distinguished from each other by their operational situations. However, since the spacing between the magnetic head slider and the magnetic disc is in the range of a few tens of nanometers at most, there is scarcely any benefit in distinguishing them from each other in practice. Therefore, pads for these liquid bearings are referred to as "contact pads" in the following description, irrespective of presence of contact.

BRIEF DESCRIPTION OF THE DRAWINGS

The above and other objects, features and advantages of the present invention will be more apparent from the following description, referring to the accompanying drawings in which.

DESCRIPTION OF PREFERRED EMBODIMENTS

Figure 1:
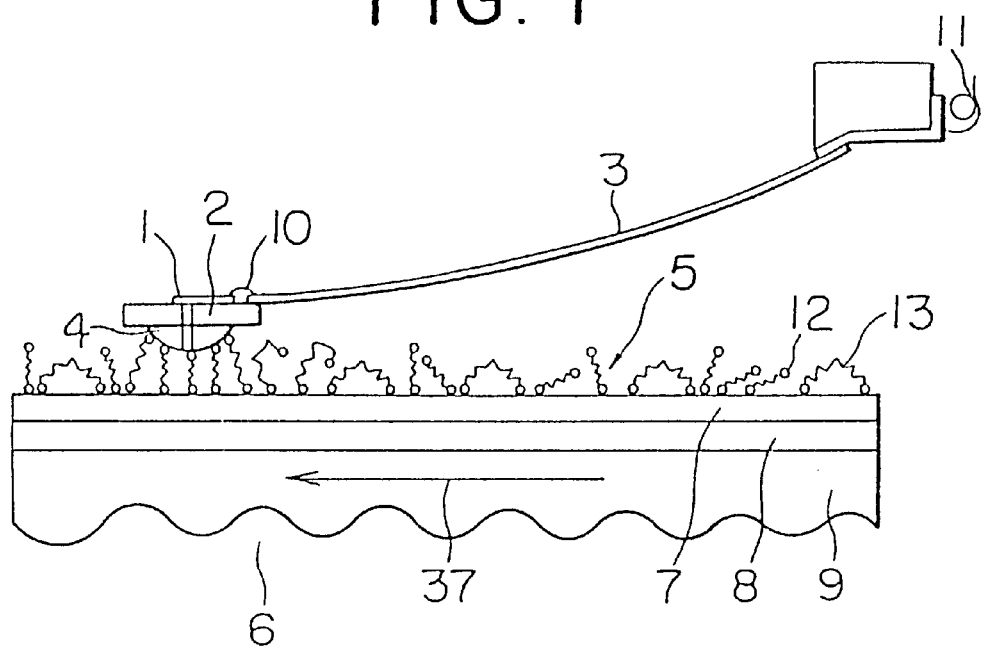
FIG. 1 is a cross-sectional view of an example of a magnetic disc drive according to the first aspect of the present invention.

Referring to FIG. 1, a magnetic disc drive system according to the first aspect of the present invention includes a magnetic disc 6, a magnetic read/write head 1 implemented by a electro-magnetic transducer for reading and/or writing information to and from the magnetic disc 6, a magnetic head slider 2 for mounting the magnetic head 1, a supporting member 3 for supporting the magnetic head slider 2 in a condition such that a load equal to or less than 500 milligram-weight (mgf) acts between the magnetic head slider 2 and the magnetic disc 6. Numeral 37 in FIG. 1 denotes the moving direction of the magnetic disc with respect to the magnetic head slider 2.

In the magnetic disc drive of FIG. 1, one or more contact pads 4 are provided on the bearing surface of the magnetic head slider 2. Liquid molecules 5 are provided between the magnetic disc 6 and the contact pad 4 so that an intermolecular force is generated therebetween.

As schematically shown in FIG. 1, each of the liquid molecules 5 has a main chain 13 and two or more polar groups 12. For example, compounds (1)–(204), as will be described later, are used as the source of liquid molecules 5. Liquid molecules are provided onto the magnetic disc by known methods such as are disclosed in U.S. Pat. No. 4,633,351 or U.S. Pat. No. 5,202,803, the descriptions of which are incorporated herein by reference.

Figure 2:
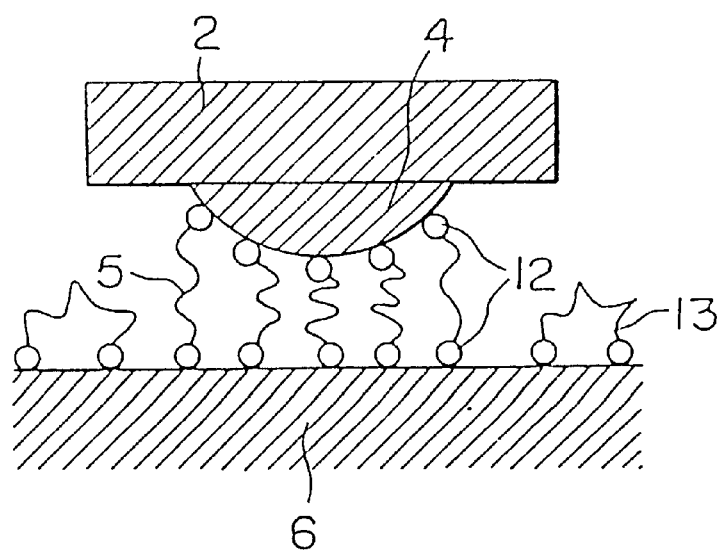
FIG. 2 is a schematic partial cross-section of the magnetic disc drive of FIG. 1, showing a contact pad and a magnetic disc coupled to each other by liquid molecules each having two polar groups.
Figure 3:
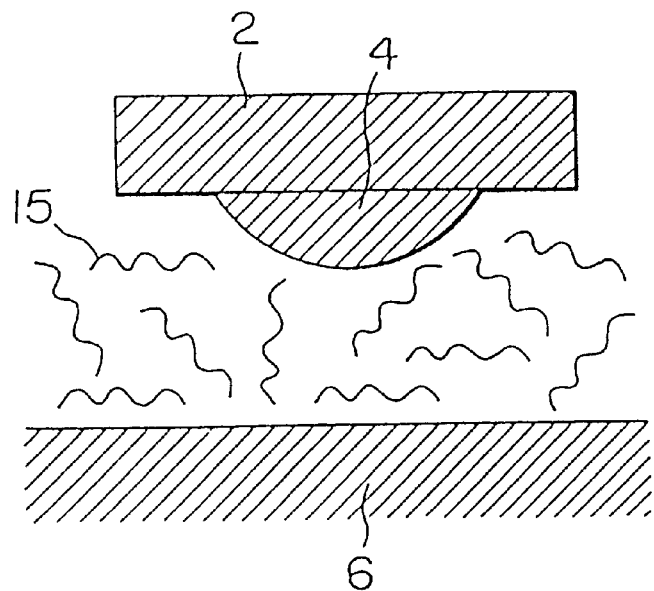
FIG. 3 is a schematic partial cross-section of a conventional magnetic disc drive, showing a contact pad and a magnetic disc coupled to each other by non-polar liquid molecules.
Figure 4:
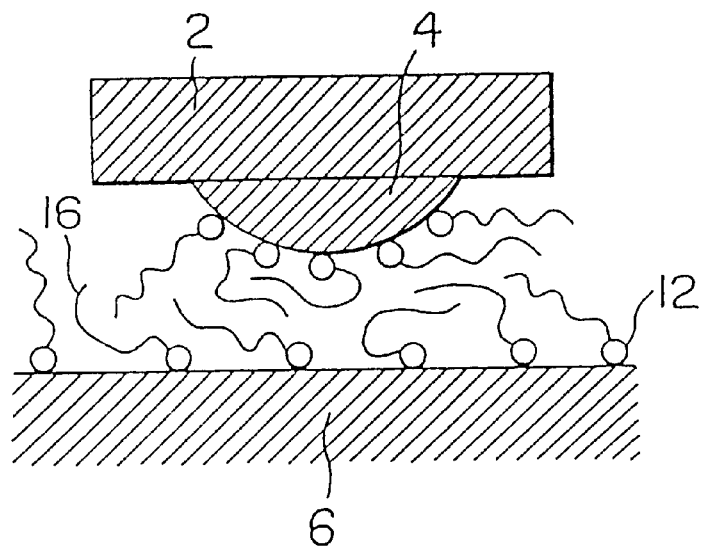
FIG. 4 is a schematic partial cross-section of a conventional magnetic disc drive, showing a contact pad and a magnetic disc coupled with each other by liquid molecules each having a single polar group.

The principle of the first aspect of the present invention will be described with reference to FIGS. 2 to 4. In FIG. 2 showing detail of the liquid bearing surface of the magnetic head slider 2 in the magnetic disc drive of FIG. 1, the contact pad 4 and the magnetic disc 6 are coupled to each other by liquid molecules 5 each having two polar groups 12 at the both ends of the main chain 13 of each of the liquid molecules 5. FIGS. 3 and 4 show conventional magnetic disc drives in a similar fashion to FIG. 2. In the magnetic disc drive shown in FIG. 3, non-polar liquid molecules 15 are interposed between the contact pad 4 and the magnetic disc 16. In the magnetic disc drive shown in FIG. 3, liquid molecules 6 each having a single polar group 12 are interposed between the contact pad 4 and the magnetic disc 6.

As shown in FIG. 2, each liquid molecule 5 having a main chain 13 and two polar groups 12 produces an effect of bridging the surface of the contact pad 4 and the magnetic disc 6 by a strong intermolecular force. This bridging effect is not produced by the non-polar liquid molecules 15 as shown in FIG. 3 or the liquid molecules 16 each having a single polar group 12 as shown in FIG. 4.

In short, the magnetic disc drive according to the first aspect of the present invention utilizes liquid molecules 5 each having two or more polar groups 12 to generate an intermolecular force between the magnetic disc 6 and the contact pad 4, whereby jumping of the magnetic head slider 2 from the surface of the magnetic disc 6 is prevented by the intermolecular force.

The compound having two or more polar groups in each liquid molecule used in the magnetic disc drive according to the first aspect of the present invention will now be detailed.

The liquid is selected from specific organic compounds, and examples of such organic compounds include hydrocarbons represented by the following general formulae (1-1), (1-2) and (1-3):

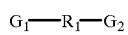

(1-1)

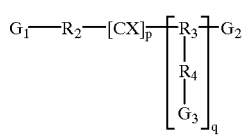

(1-2)

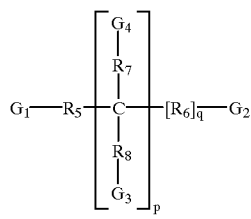

(1-3)

In formulae (1-1), (1-2) and (1-3), G1, G2, G3 and G4 are functional groups selected from the group consisting of —OH, —COOH, —COOR, —OOCC(CH$_3$)=CH$_2$, —NH$_2$, —N(CH$_3$)$_2$, —CH=CH$_2$, —NCO, —SO$_3$H and —N=N—NH$_2$, wherein R is —H, -C$_n$X$_{2n+1}$, —C$_6$X$_5$ (benzene ring), or —C$_n$X$_{2n+1}$C$_6$X$_5$ (h and n are each integers of 1–4).

Functional groups containing oxygen are more preferred than a functional group having a double bond or a function group having π electrons such as a benzene ring. Functional groups such as —OH and —COOH, and functional groups such as an amino group and a sulfonic acid group are particularly preferred because of their strong interaction. Hydrocarbons having functional groups disclosed in JP-A-5-217157 may be used.

R$_1$–R$_8$ are carbon chains represented by C$_i$X$_{2i}$, [C$_j$X$_{2j}$O] which contain X (H, F, Cl, Br or I). Values for i and j are integers selected from 1–6. If n, i or j is too large, the compound will be solid at ambient temperature. To avoid this condition, the values for n, i and j are limited as described above. The values for p and q are integers equal to or greater than 1. Values for upper limits of p and q are determined based on whether the organic compound becomes solid at ambient temperature. Therefore, p and q cannot be defined absolutely because these values vary depending on the types of recurring unit.

Examples of the specific organic compounds, which are expressed by general formula (1-1), (1-2) or (1-3) and are suitable for use in the magnetic disc drive according to the first aspect of the present invention, include the following compounds:

(1) ethylene glycol: HOCH$_2$CH$_2$OH,
(2) propylene glycol: H$_3$CCH(OH)CH$_2$OH,
(3) trymethylene glycol: HO(CH$_2$)$_3$OH,
(4) 1,4-butanediol: HO(CH$_2$)$_4$OH,
(5) 1,3-butylene glycol: H$_3$CCH(OH)CH$_2$CH$_2$OH,
(6) 1,5-pentanediol: HO(CH$_2$)$_5$OH,
(7) octanediol: H$_3$CC$_2$H$_4$CH(OH)CH(C$_2$H$_5$)CH$_2$OH,
(8) glycerol: CH$_2$(OH)CH$_2$(OH)CH$_2$(OH),
(9) diglycerol: H$_2$C(OH)CH(OH)CH$_2$OCH$_2$CH(OH)CH$_2$(OH),
(10) dipropylene glycol: [H$_3$CCH(OH)CH$_2$]$_2$O, and
(11) polyethylene glycol: HO(CH$_2$CH$_2$O)nCH$_2$CH$_2$OH.
(wherein n is an integer which falls in the range that makes the molecular weight from 190 to 630)

Examples of organic compounds used in the first aspect of the present invention other than the above compounds include (12) diethylene glycol, (13) triethylene glycol, (14) heptaethylene glycol, (15) diiodomethane, (16) dibromomethane, (17) dibromooctane, (18) dibromobutane, (19) diburomohexane, (20) dimethylsulfoxide, (21) dichlorohexane, (22) dichlorooctane, (23) dioxane, (24) methacrylate copolymers, (25) oxalic acid esters, and (26) malonic acid esters.

Examples of succinic acid esters which can be used as the organic compound in the first aspect include (27) succinic acid dimethyl esters, (28) succinic acid monoethyl esters, (29) succinic acid methylethyl esters, (30) succinic acid di-2-oxyethyl esters, (31) succinic acid diallyl esters, and (32) succinic acid ethyl ester nitrile.

Also, compounds such as (33) gultaric acid esters, (34) adipic acid esters, (35) pimeric acid esters, (36) suberic acid esters, (37) azelaic acid esters, (38) sebacic acid esters, maleic acid esters (for example, (39) maleic acid dimethyl esters: H3COOCCH=CHCOOCH3), (40) fumaric acid esters, (41) phthalic acid esters, (42) isophtalic acid esters, (43) terephtalic acid esters, and (44) glycolic acid ethers may be used.

The following polyethers and polyols may also be used:

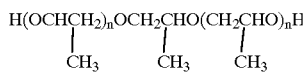

[including, for example, compound (45) wherein n is an integer which falls in the range that makes the average molecular weight from 200 to 4000];

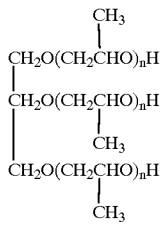

[including, for example, compound (46) wherein n is an integer which falls in the range that makes the average molecular weight from 250 to 4000];

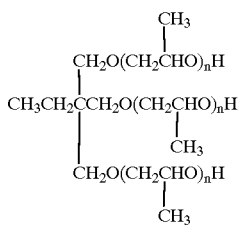

[including, for example, compound (47) wherein n is an integer which falls in the range that makes the average molecular weight 400];

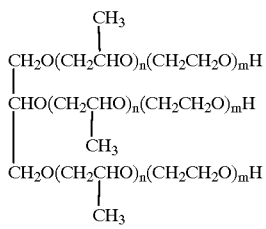

[including, for example, compound (48) wherein n and m are integers which make the average molecular weight 3000];

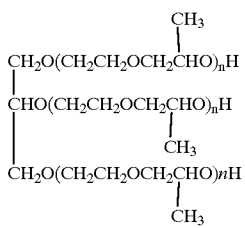

[including, for example, compound (49) wherein n is an integer which makes the average molecular weight 2600];

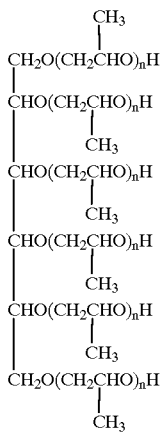

[including, for example, compound (50) wherein n is an integer which makes the average molecular weight 700]; and

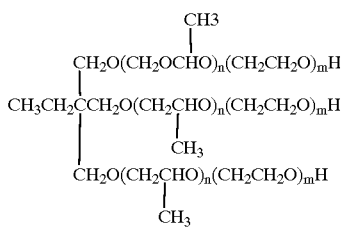

[including, for example, compound (51) wherein n and m are integers which make the average molecular weight 4500].

Other examples of liquids having two or more polar groups in the molecule which can be used in the magnetic disc drive according to the first aspect of the present invention include silicone oils (silicone compounds) represented by general formula (2):

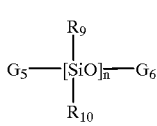

(2)

Examples of the silicone oils represented by the general formula (2) and which can be suitably used in the first aspect of the present invention include the following compounds: (100) terminal silanol polydimethylsiloxanes [wherein $G_5$:—OH, $G_6$:—H, $R_9$, $R_{10}$:—CH$_3$, n=7–4,000]; terminal alcohol polydimethylsiloxanes such as (101) terminal carbinol [wherein $G_5$:$HOCH_2CH_2O$—, $G_6$:—$CH_2CH_2OH$, $R_9$, $R_{10}$:—$CH_3$, n is an integer corresponding to the molecular weight of 2,400];

(102) terminal hydroxylpropyl [wherein $G_5$:$HOCH_2CH_2CH_2O$—, $G_6$:—$CH_2CH_2CH_2OH$, $R_9$, $R_{10}$:—$CH_3$, n is an integer corresponding to the molecular weight of 2,400];

(103) polydimethylhydroxyethyleneoxide methylsiloxane [wherein $G_5$:—$OSi(CH_3)_3$, $G_6$:—$[Si(CH_3)(OCH_2CH_2O)_m Si(CH_3)_3$, m=3, $R_9$, $R_{10}$:—$CH_3$, n is an integer corresponding to the molecular weight of 50–4,000];

(104) terminal acetoxypolydimethyl siloxanes [wherein $G_5$:—$OOCCH_3$, $G_6$:—$Si(CH_3)CH_2OOCCH_3$, $R_9$, $R_{10}$:—$CH_3$, n is an integer corresponding to the molecular weight of 36,000];

(105) terminal dimethylaminopolydimetyl siloxanes [wherein $G_5$:—$N(CH_3)_2$, $G_6$:—$Si(CH_3)_2N(CH_3)_2$, $R_9$, $R_{10}$:—$CH_3$, n is an integer corresponding to the molecular weight of 425–600];

(106) terminal ethoxypolydimethyl siloxanes [wherein $G_5$:—$OC_2H_5$, $G_6$:—$C_2H_5$, $R_9$, $R_{10}$:—$CH_3$, n is an integer corresponding to the molecular weight of 360–450];

(107) terminal stearoxypolydimethyl siloxanes [wherein $G_5$:$C_{17}H_{35}COO$—, $G_6$:—$OC_{17}CH_{35}$, $R_9$, $R_{10}$:—$CH_3$, n is an integer corresponding to the molecular weight of 360–450];

(108) terminal amino group polydimethyl siloxanes [wherein $G_5$:$H_2NC_3H_6$—, $G_6$:—$Si(CH_3)_2C_3H_6NH_2$, $R_9$, $R_{10}$:—$CH_3$, n=1];

(109) terminal carboxypropylpolydimethyl siloxanes [wherein $G_5$:$HOOC_3H_6$—, $G_6$:—$Si(CH_3)_3C_3H_6COOH$, $R_9$, $R_{10}$:—$CH_3$];

(110) terminal carboxyproplyl T-structure polydimethyl siloxanes [wherein $G_5$:$HOOC_3H_6$—, $G_6$:—$[Si(CH_3)_2O]_kSi(CH_3)_3$, $R_9$, $R_{10}$:—$O[Si(C_{16}H_{32}O]_lSi(CH_3)_3$,n, k, and l are each integers corresponding to the molecular weight of 100–10,000];

(111) terminal glycidoxypropylpolydimetyl siloxane [wherein $G_5$: a group represented by formula

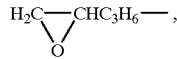

$G_6$: a group represented by formula

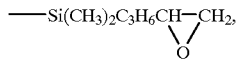

$R_9$, $R_{10}$:—$CH_3$, n is an integer corresponding to the molecular weight of 363];

(112) polyglycidoxypropylmethyl siloxanes [wherein $G_5$, $G_6$:—$(CH_3)_3$, $R_9$: a group represented by formula

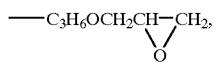

$R_{10}$:—$CH_3$];

(113) polyglycidoxypropylmethyldimethyl siloxane copolymers [wherein $G_5$:$(CH_3)_3SiO$—, $G_6$:—$[Si(CH_3)_2O]_rSi(CH_3)_3$, $R_9$: a group represented by formula

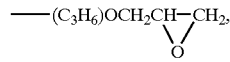

$R_{10}$:—$CH_3$, n and t are integers corresponding to the molecular weight of 100–1,000];

(114) terminal methacryloxypropylpolydimethyl siloxane [wherein $G_5$:$CH_2$=$C(CH_3)COOC_3H_6$—, $G_6$:—$Si(CH_3)_2C_3H_6OOCC(CH_3)_3$=$CH_2$, $R_9$, $R_{10}$:—$CH_3$, n is an integer corresponding to the molecluar weight of 387];

(115) polydimethylmethacryloxypropylmethyl siloxanes [wherein $G_5$:$(CH_3)_3SiO$—, $G_6$:—$[Si(CH_3)_2O]aSi(CH_3)_3$, $R_9$:—$C_3H_6OOC(CH_3)$=$CH_2$, $R_{10}$:—$CH_3$, n and a are integers corresponding to a molecluar weight of 100–1000]; and (116) polymrercaptopropylmethyl siloxanes [wherein $G_5$: $(CH_3)_3SiO$—, $G_6$:—$Si(CH_3)_3$, $R_9$:—$C_3H_6SH$, $R_{10}$:—$CH_3$, n and a are integers corresponding to the molecular weight of 100–1000].

Silicone oils which are not expressed by formula (2) can also be used. The following compound is mentioned as an example of one of such silicone oils:

(117) bis(aminoplopyldimethylsylyl)benzene:

Further examples of liquids having two or more polar groups in the molecule which can be used in the magnetic disc drive according to the first aspect of the present invention are fluorine-containing hydrocarbon compounds represented by general formula (3):

(3)

wherein $G_7$ is —$COOCH_3$, —$COOH$, —$CH_2OH$, or $CONHC_6H_3(CH_3)NCO$—(hereinafter referred to as "Is"). $G_7$ may be a piperonyl group (hereinafter referred to as "Pi").

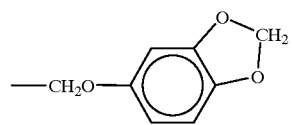

Further, r and s in general formula (3) are integers corresponding to the molecular weight of 1,000–10,000, and the ratio r/s is in the range of 0.5–2.0. Examples of fluorine-containing hydrocarbon compounds represented by general formula (3) include the following:

(200) $HOCH_2CF_2[OC_2F_4]_r[OCF_2]_sOCF_2CH_2OH$
  (wherein r/s=0.8, molecular weight: 2,300);
(201) $HOOCCF_2[OC_2F_4]_r[OCF_2]_sOCF_2COOH$
  (wherein r/s=0.8, molecular weight: 2,000);
(202) $H_3COOCCF_2[OC_2F_4]_r[OCF_2]_sOCF_2COOCH_3$
  (wherein r/s=0.8, molecular weight: 2,200);
(203) $PiCF_2[OC_2F_4]_r[OCF_2]_sOCF_2Pi$
  (wherein r/s=0.8, molecular weight: 2,000); and
(204) $IsCF_2[OC_2F_4]_r[OCF_2]_sOCF_2Is$
  (wherein r/s=0.8, molecular weight: 2,500).

In the above-description, specific organic compounds used as liquid having two or more polar groups in the molecule have been listed. However, the liquids used in the present invention are not limited to those compounds, and other materials can also be used insofar as they meet the following requirements:

(a) it must be liquid at normal operating temperature (for example, 0–80° C. ) of a magnetic disc drive in which the material is used;
(b) it should not evaporate substantially during a period of, for example, 5 years;
(c) it has neither toxicity nor corrosivity; and
(d) it should not scatter due to rotation of the magnetic disc.

As described above, the magnetic disc drive system of the first aspect of the present invention features the use of a liquid molecule having two or more polar groups in the molecule. Due to this feature, the magnetic disc 6 and the contact pad 4 are coupled to each other with a larger force compared to the non-polar liquid 15 having no polar groups as shown in FIG. 3 and the polar liquid 16 having a single polar group in the molecule as shown in FIG. 4. Accordingly, the effect of preventing jumping of the magnetic head slider is remarkable.

By the nature of the liquid molecules each having two or more polar groups, the longer the molecule, the larger will be the spacing within which the intermolecular force can be effectively produced. Therefore, jumping of the magnetic head slider can be prevented even when the spacing is large.

Those examples of the compounds having two or more polar groups in the liquid molecular which have been listed heretofore include organic molecules disclosed in JP-A-60-202534, JP-B-6-54539, and JP-B-6-10868. However, it should be noted that those liquids are effective in the present invention only for a contact type magnetic head slider which moves at a relative speed of 10 m/sec and on which a load not greater than 500 mg acts between the bearing surface and the magnetic disc.

The reason why those liquids are effective in such operating conditions is that the jumping force of the magnetic head slider is weak in such a light load range so that the two polar groups 12 attract each other to produce a sufficient intermolecular force.

In contrast, in a heavy load range in which a few grams of load act between the magnetic head slider and the magnetic disc, the liquid film cannot effectively prevent jumping of the magnetic head slider. When a magnetic head of large dimension and large mass is used, a bearing surface having large area is generally formed on the magnetic head slider so as to produce an air bearing force. In this case, sticking force due to the liquid film increases, so that the amount of jumping (referred to as jumping amount hereinafter and in the drawings) of the magnetic head slider upon contacting the magnetic disc rather increases.

As described before, JP-A-5-54578 discloses use of perfluoro polyethers having polar terminal groups in a liquid bearing in which attractive force due to surface tension is utilized. However, this publication contains no description on the number of the polar terminal groups.

In the first aspect of the present, the liquid film made of liquid molecules each having two or more polar groups is used to utilize the intermolecular force of the liquid film, unlike the conventional technique in which only the surface tension of a liquid film is utilized.

Next, a magnetic disc drive according to the second aspect of the present invention will be described in detail.

The magnetic disc drive system according to the second aspect of the present invention comprises a magnetic disc, a magnetic read/write head composed of an electromagnetic transducer, a magnetic head slider by which the magnetic head is carried, a supporting mechanism for supporting the magnetic head slider in a condition such that a load equal to or less than about 500 mgf acts between the magnetic head slider and a magnetic disc. In the magnetic disc drive, one or more contact pads each having a convex portion and a flat portion (or concave portion) are provided. Also, a liquid film having a non-polar group or one or more polar groups is provided between the flat portion of the contact pad and the magnetic disc.

Figure 5:
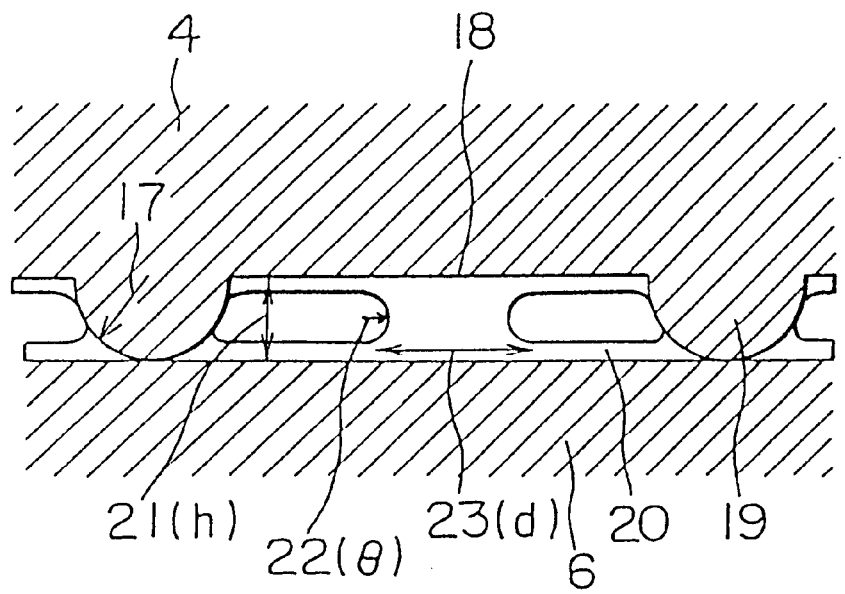
FIG. 5 is a magnified schematic cross-section of an example of a magnetic disc drive according to the second aspect of the present invention, showing a liquid film existing between a contact pad and a magnetic disc.

The contact pad used in the magnetic disc drive of the second aspect will be described with reference to FIG. 5. In the drawing, the contact pad 4 having convex portions 19 and a flat portion 18 are positioned over a magnetic disc 6, with the convex portions 19 being contacted with the surface of the magnetic disc 6. Liquid films 20 having meniscus Θ denoted by numeral 22 are interposed between the flat portion 18 and the magnetic disc 6 which are opposed to each other with a spacing "h", denoted by numeral 21, being present therebetween. The convex portion 19 is formed of a semisphere or a minor portion of a sphere having a radius denoted by numeral 17. In the drawing, numeral 23 denotes the inner diameter (d) of the contact area of the flat portion 18 by which the flat portion bears on the liquid film.

The attractive force (F) of the liquid film 20 formed between the flat portion 18 and the magnetic disc 6 is represented by the following equation (2):

$$F=(A\gamma \cdot \cos \phi)/h \quad (2)$$

wherein A represents the contact area of the flat portion. As is apparent from equation (2), the attractive force (F) varies in proportion to the contact area A of the liquid film 20, and is inversely proportional to the spacing h. That is, the attractive force (F) of the liquid film 20 increases when the spacing h decrease, and when the size A of the contact area increases, the attractive force preventing the jumping of the magnetic head slider increases.

The attractive force (F') of the liquid film 20 formed on the convex portion 19 is represented by the following equation (3), as described in JP-A-5-54578:

$$F'=4\pi R \cdot \gamma. \quad (3)$$

Therefore, the attractive force (F') depends only on the radius of curvature R of the convex portion 19 and is not affected by the spacing h.

From the above, it will be understood that the presence of the flat portion 18 on the contact pad 4 is important so as to utilize the attractive force due to the surface tension γ of the liquid film which prevents jumping of the magnetic head slider.

In the magnetic disc drive of the second aspect of the present invention, it is sufficient that the amount of projection of the convex portion 19 with respect to the flat portion 18 be equal to or greater than 0.6 nm which allows liquid molecules to exist under the flat portion 19.

If the amount of projection is increased, the spacing between the magnetic head and the magnetic disc is increased, resulting in reduction in the recording density. In this respect, the amount of projection of the convex portion 19 from the flat portion 18 is preferably not greater than 50 nm. Accordingly, the amount of projection of the convex portion 19 from the flat portion 18 is preferably in the range of 0.6–50 nm.

Next, liquid compounds which can be used in the magnetic disc drive of the second aspect of the present invention will be described.

Examples of such liquids include:
(a) a non-polar liquid (any one of the following liquids (300)–(309));
(b) a liquid having a single polar group in the molecule (any one of the following liquids (310)–(315)); and (c) a liquid having two or more polar groups in the molecule (any one of the liquids (1)–(204) as described before).

Examples of non-polar liquids include:
(300) $F_3C(OC_2F_4)_r(OCF_2)_sOCF_2OCF_3$
  (wherein r/s=0.8, molecular weight: 12,000);
(301) $F_3C(OC_2F_4)_r(OCF_2)_sOCF_2OCF_3$
  (wherein r/s=0.8, molecular weight: 2,700);
(302) $F_3C[OCF(CF_3)CF_2]_r(OCF_2)_sOCF_3$
  (wherein r/s=20–40, molecular weight: 6,500);
(303) $F_3C[OCF(CF_3)CF_2]_r(OCF_2)_sOCF_3$
  (wherein r/s=20–40, molecular weight: 1,800);
(304) $F[CF(CF_3)CF_2O]_dC_2F_5$
  (molecular weight: 8,250);
(305) $F[CF(CF_3)CF_2O]_dC_2F_5$
  (molecular weight: 3,800);
(306) $F(C_3F_6O)_eC_2F_5$
  (molecular weight: 8,400);
(307) $F(C_3F_6O)_eC_2F_5$
  (molecular weight: 2,500);
(308) $H_3C[Si(CH_3)_2O]_fSi(CH_3)_3$
  (molecular weight: 423,000); and
(309) $H_3C[Si(CH_3)_2O]_fSi(CH_3)_3$
  (molecular weight: 162).

Examples of liquids having a single polar group in the molecule include:
(310) $F[CF(CF_3)CF_2O]_dC_2F_4COOH$
  (molecular weight: 7,000);
(311) $F[CF(CF_3)CF_2O]_dC_2F_4CH_2OH$
  (molecular weight: 4,500);
(312) $F(C_3F_{60})_eC_2F_4COOCH_3$
  (molecular weight: 4,000);
(313) $F(C_3F_{60})_eC_2F_4COOCH_2C_6H_5$
  (molecular weight: 4,100);
(314) $F(C_3F_{60})_eC_2F_4COOH$
  (molecular weight: 3,300); and
(315) $F(C_3F_{60})_eC_2F_4CH_2OH$
  (molecular weight: 3,400).

Next, the number and layout of the contact pads provided in the magnetic disc drive according to the first and second aspects of the present invention will be described with reference to FIG. 6–FIG. 10.

Figure 6:
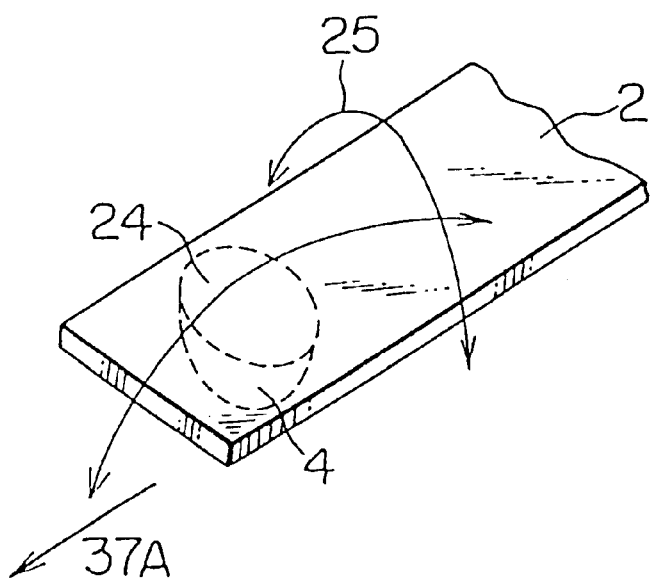
FIG. 6 is a perspective view of a magnetic disc drive according to a first embodiment of the present invention.
Figure 7:
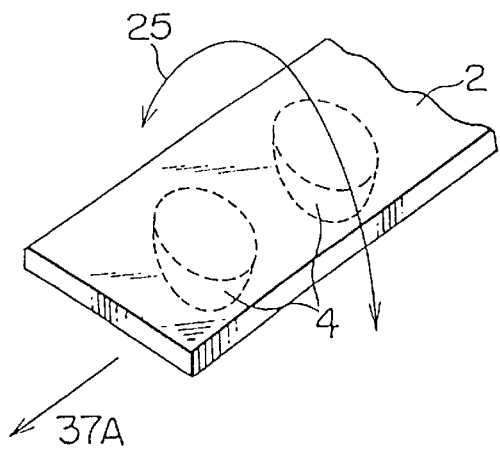
FIG. 7 is a perspective view of a magnetic disc drive according to a second embodiment of the present invention.
Figure 8:
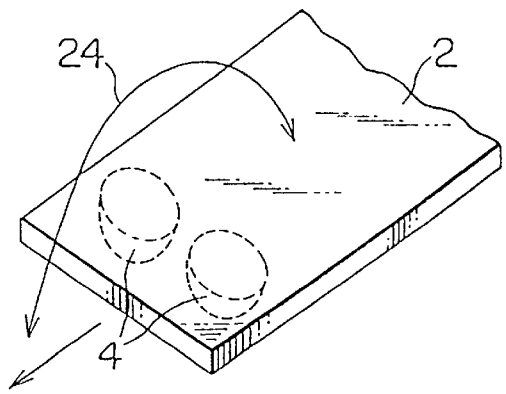
FIG. 8 is a perspective view of a magnetic disc drive according to a third embodiment of of the present invention.
Figure 9:
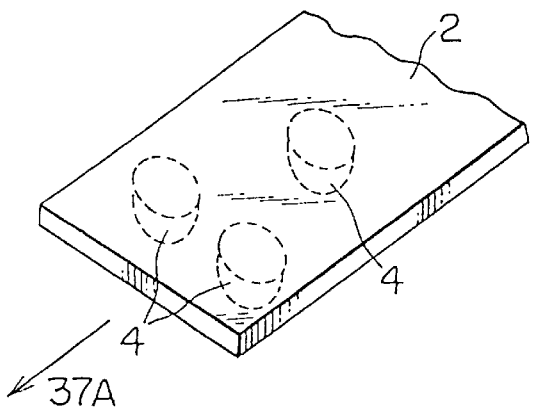
FIG. 9 is a perspective view of a magnetic disc drive according to a fourth embodiment of the present invention.
Figure 10:
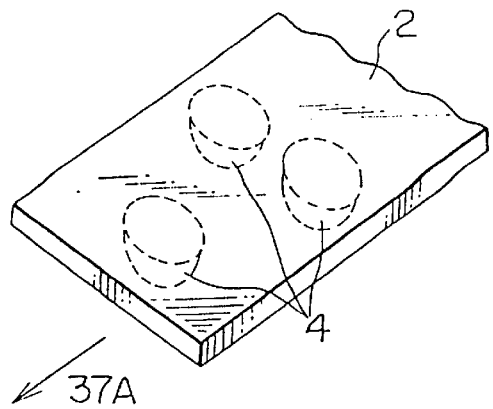
FIG. 10 is a perspective view of a magnetic disc drive according to a fifth embodiment of the present invention.

FIG. 6 shows a magnetic head slider having a single contact pad, FIGS. 7 and 8 each show a magnetic head slider having two contact pads, and FIGS. 9 and 10 each show a magnetic head slider having three contact pads. In FIGS. 6–10, numeral 2 denotes a magnetic head slider, numeral 4 denotes a contact pad, numeral 37A denotes the direction of movement of the magnetic disc.

In the magnetic disc drive of the present invention, only a single contact pad 4 is effective to prevent the magnetic head slider 2 from jumping. However, the magnetic head slider 2 having a single contact pad 4 is susceptible to pitching 24, i.e., periodic inclination parallel to the moving direction 37A of the magnetic head slider, and rolling 25, i.e., periodic inclination perpendicular to the moving direction 37A, as shown in FIG. 6. Pitching 24 and rolling 25 cause the read/write head, which is closest to the magnetic disc in the magnetic disc drive, to rise and fall, so that the spacing between the read/write head and the magnetic head varies.

Accordingly, to obtain a stable read/write condition, it is preferable to provide two or three contact pads. In this case, the provision of three contact pads provides a more stable state compared to the case where two contact pads are provided.

When the number of the contact pads is three or less, all the contact pads can be made to contact the magnetic disc. However, when the number of the contact pads is four or more, all the contact pads cannot contact the magnetic disc simultaneously, because the projections of all the contact pads cannot be made exactly the same in the slider, thus resulting in increasing variation of the spacing.

When two contact pads 4 are aligned in the moving direction 37A of the magnetic head slider as shown in FIG. 7, rolling 25 does not decrease although pitching decreases. Also, when two contact pads 4 are aligned in a direction perpendicular to the moving direction 37A as shown in FIG. 8, pitching 25 does not decrease although rolling decreases.

In contrast, when three pads 4 are provided as shown in FIGS. 9 and 10, both rolling and pitching can be decreased.

In view of the above, in an particularly preferred embodiment of the magnet disc drive of the first and second aspects of the present invention, three contact pads are provided on the magnetic head slider.

There are two designs of the layout of the three contact pads on the magnetic head slider. That is, in the first design, two of the three pads are disposed near the leading side of the bearing surface such that they are aligned in the direction perpendicular to the moving direction 37A of the magnetic head slider with respect to the magnetic disc, and the remaining one is disposed near the trailing side of the bearing surface, as shown in FIG. 9. In the second design, one of the three pads is disposed near the leading side of the bearing surface, and the remaining two are disposed near the trailing side of the bearing surface such that they are aligned in the direction perpendicular to the moving direction 37A of the magnetic head slider, as shown in FIG. 10.

Figure 15:
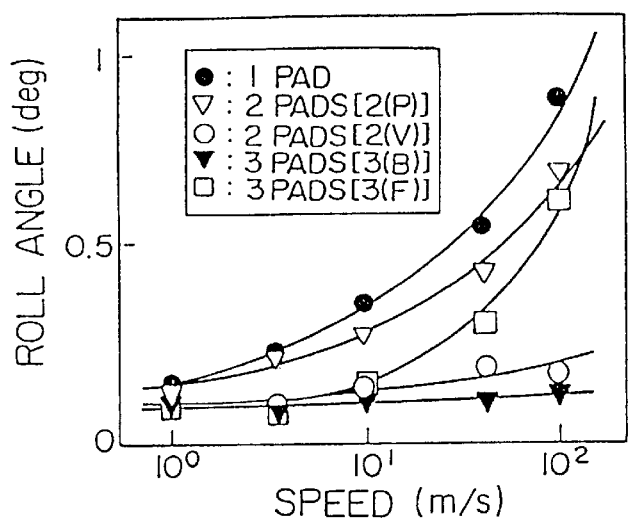
FIG. 15 is a graph showing the relationship between the speed of the magnetic head slider and the roll angle thereof.

When the liner speed of the magnetic head slider is low, any significant difference is generated between the two arrangements of FIGS. 9 and 10. In the layout shown in FIG. 9, the area of the bearing surface for receiving air flow is large due to the two leading pads so that the magnetic head slider is more greatly affected by lifting force by the air flow, which is demonstrated in FIG. 15 showing the relationship between the speed of the slider and roll angle. In contrast, in the layout shown in FIG. 10, the area of the bearing surface for receiving air flow is small due to the single leading pad so that the magnetic head slider is less affected by lifting force by the air flow. Accordingly, the layout shown in FIG. 10 is more preferable than that shown in FIG. 9.

In the magnetic disc drive of the first and second aspects of the present invention, the dimension of the magnetic head slider affecting the weight and load of the magnetic head slider is an important factor.

For example, in the magnetic disc drive disclosed in U.S. Pat. No. 5,202,803 which uses three contact pads for a liquid bearing film, a load of 6 gram-weight (gf) acts on the magnetic head slider against the magnetic disc. In contrast, the magnetic disc drive of the second aspect of the present invention is designed such that a lighter load equal to or less than about 500 milligram-weight (mgf) acts on the magnetic head slider against the magnetic disc to obtain the advantage of preventing the magnetic head slider from jumping.

Figure 13:
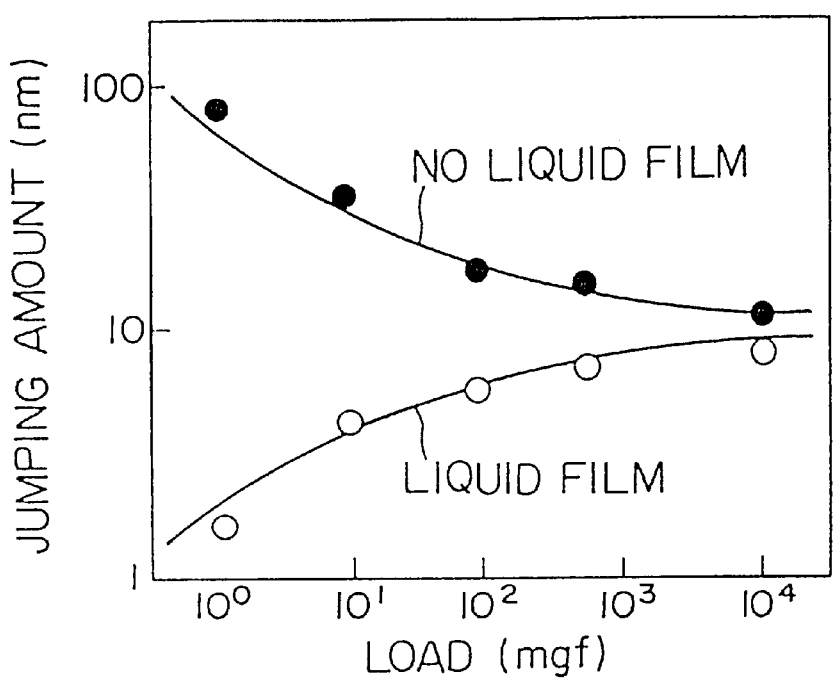
FIG. 13 is a graph showing the relationship between the load acting on the magnetic head slider and the jumping amount thereof.

It should be noted that the effect of preventing the magnetic head slider from jumping in the magnetic disc drive of the present invention is remarkable in a light load range, which is demonstrated in FIG. 13 showing the relationship between the load and the jumping amount.

In a large load range in which large friction and large inertia are produced, the jumping force of the magnetic head slider is larger than the attractive force of the liquid molecules produced by the present invention.

The support mechanism for supporting the magnetic head slider is preferably made of a material which is suitable to make a spring, such as stainless steel, phosphor bronze, silicon, or alumina.

The magnetic head slider having contact pads can be made of a hard material such as ferrite, alumina, sintered body of alumina and titanium carbide, sintered body of beryllium oxide and titanium carbide, sintered body of alumina and SiC, calcium titanate, barium titanate, glassy carbon, amorphous carbon, $SiO_2$, $ZrO_2$, $TiO_2$, boron nitride, sapphire, Si, diamond and the like.

Figure 11A:
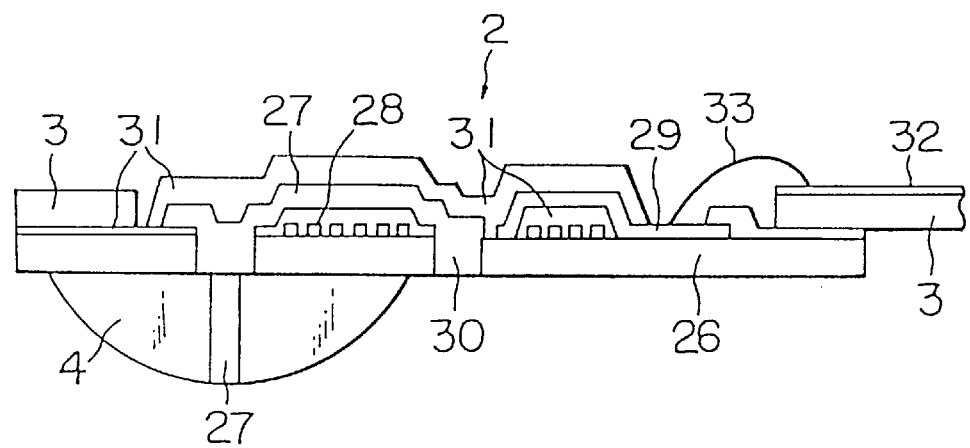
FIG. 11A is an enlarged partial cross-sectional view of of the magnetic head slider shown in FIG. 1, for showing structure of the substrate portion.
Figure 11B:
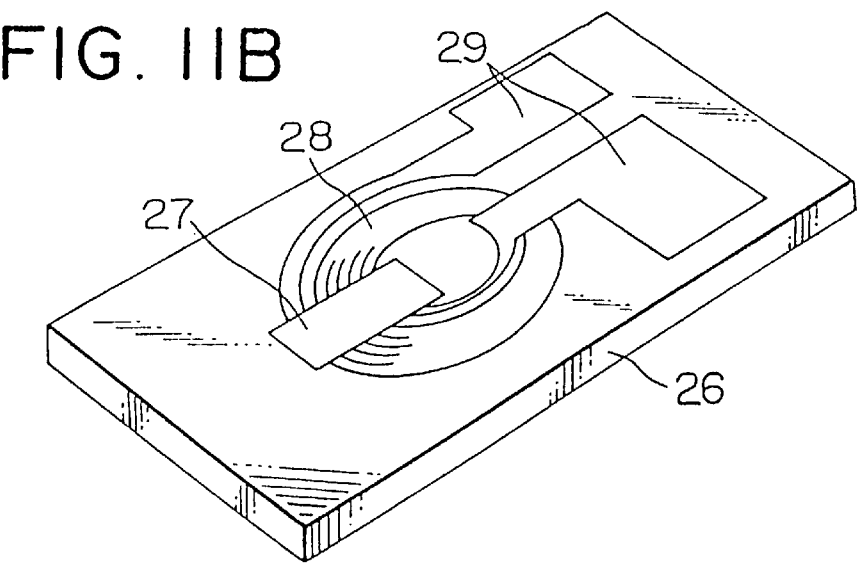
FIG. 11B is a perspective view of the substrate shown in FIG. 11A.
Figure 11C:
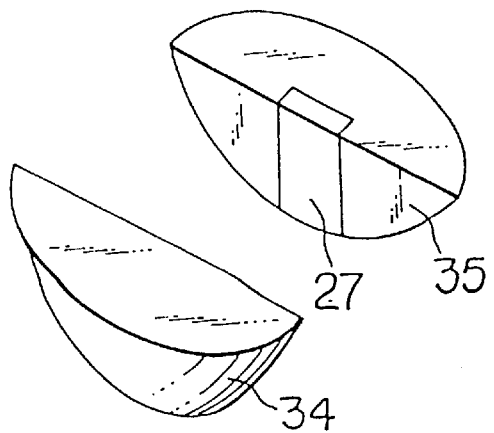
FIG. 11C is a perspective view of the contact pad shown in FIG. 11A.
Figure 12A:
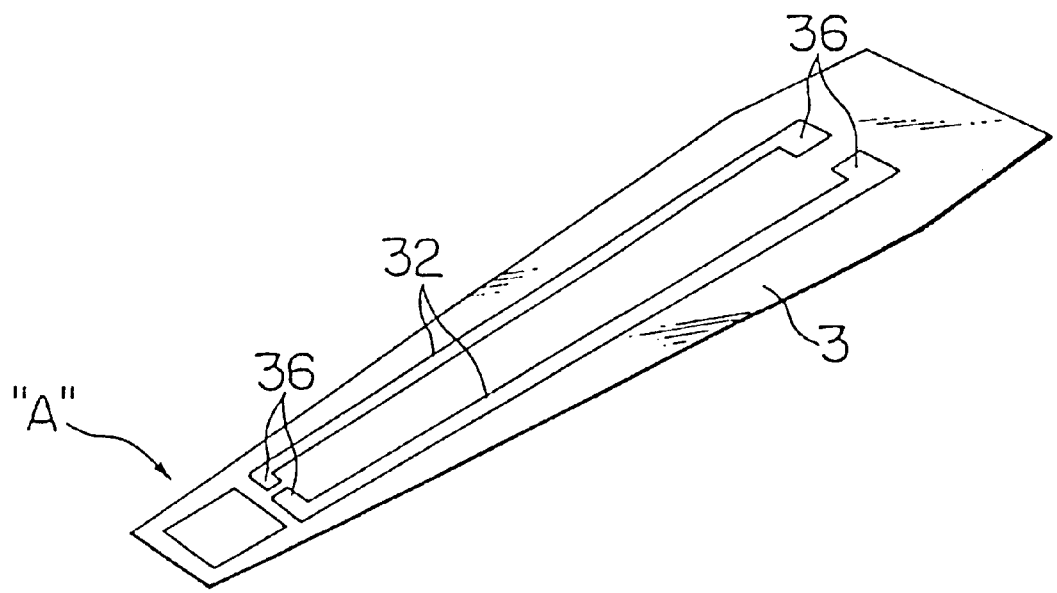
FIG. 12A is a perspective view showing the detailed structures of the magnetic head slider and supporting member for supporting the magnetic head slider of the magnetic disc drive shown in FIG. 1.
Figure 12B:
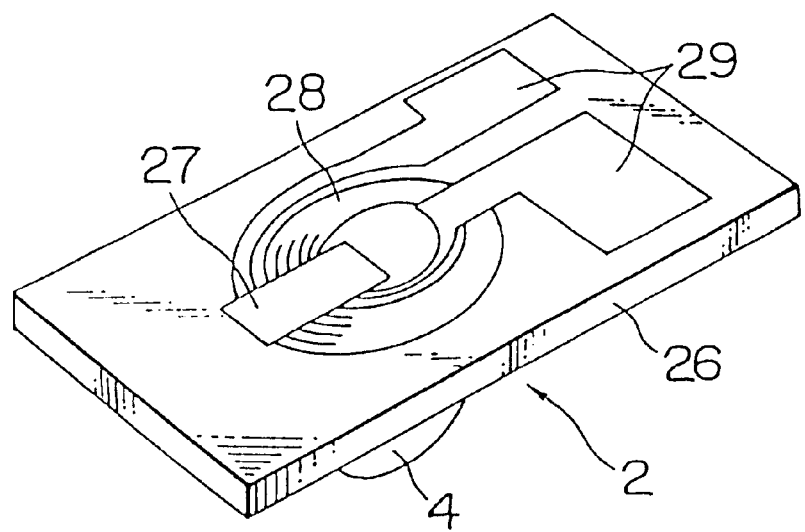
FIG. 12B is an enlarged partial perspective view of portion "A" of FIG. 12A.

The method for manufacturing a magnet disc drive system of the present invention will be described with reference to FIGS. 1, 11A, 11B, 11C, 12A and 12B. FIG. 11A shows a cross-section of the substrate portion or magnetic head slider of FIG. 1, FIG. 11B shows detail of the substrate portion in FIG. 11A, and FIG. 11C shows detail of the contact pad 4 in FIG. 11A. FIG. 12A shows the magnetic head supporting mechanism, and FIG. 12B shows detail of portion "A" in FIG. 12A.

To manufacture the magnetic disc drive of FIG. 1, a liquid compound containing liquid molecules 5 is applied onto the magnetic disc 6 by dipping, for example, such that a liquid film having a thickness of 3 nm is formed on the magnetic disc. The magnetic disc 6 is composed of a protection layer 7, a magnetic recording carrier 8, and a glass substrate 9.

In manufacturing the magnetic disc 6, CoPtCr is spattered on the glass substrate 9 to form a magnetic recording carrier 8 having a thickness of 30 nm. Subsequently, carbon containing 10% hydrogen is spattered onto the magnetic recording carrier 8 to obtain protecting film 7 having a thickness of 2 nm. In the present invention, the substrate 9, magnetic recording carrier 8 and protection layer 7 may be made of any known materials used in a conventional magnetic disc.

A stainless plate measuring 10 mm in length, 0.5 mm in width, and 0.03 mm in thickness was used as the magnetic head slider supporting mechanism 3. However, the present invention is not limited only to these materials and dimensions of the magnetic head slider supporting mechanism 3.

In FIG. 11A, the magnetic head slider 2 has a substrate 26 made of diamond, in which holes are formed at locations corresponding to a yoke 27 and a return yoke 30, a coil 28 made of thin copper film and formed on the substrate 26, and an insulating film 31 made of a thin film of $SiO_2$ and formed on the coil 28. Further, the yoke 27 formed of a thin film of iron-nickel alloy is provided on the insulating film 31.

The coil 28 is connected to electrodes 29, as shown in FIG. 11B. The electrodes 29 are connected to a wiring film 32 formed on the magnetic head slider supporting mechanism 3 via gold wires 33. The yoke 27 is coupled to the return yoke 30 to form a passage for magnetic flux.

The contact pad 4, as illustrated in FIG. 11C, is composed of first and second pad halves 34 and 35, both made of diamond, and the yoke 27 is embededed in the second pad half 35. The first and second pad halves 34 and 35 are bonded together and then bonded to the substrate 26. Thereafter, the contact pad 4 is subjected to spherical grinding with maximum surface roughness Rmax of about 0.5 nm. The magnetic head slider 2 manufactured as described above is bonded to the magnetic head slider supporting mechanism 3 having electrodes 36 and wiring film 32 so as to obtain the magnetic disc drive shown in FIG. 1.

Samples of the embodiments of the first and second aspects of the present invention were manufactured and subjected to evaluation tests. In these embodiments, the compound for the liquid molecules, and the shape, number and position of contact pad 4 are varied sample by sample. Results of the testing of the embodiments as well as comparative examples are shown in Tables 1 and 2.

Embodiments 1–78 are samples of the magnetic disc drive of the first aspect of the present invention, in which liquid molecules each having two or more polar groups are used, and a contact pad or pads each having a smoothed surface are provided on the bearing surface of the magnetic head slider. These embodiments are shown in Table 1.

Compounds (1)–(51) (hydrocarbons) were used to provide the liquid molecules each having two or more polar groups in Embodiments 1–51. Similarly, compounds (100)–(117) were used in Embodiments 52–69, compounds (200)–(204) (fluorine-containing hydrocarbons) in Embodiments 70–74, and compound (1) (hydrocarbon) in Embodiments 75–78.

One or more contact pads each having a smoothed pad surface are provided on the magnetic head slider in each of the Embodiments 1–78. In each of Embodiments 1–74, a single contact pad is provided on the bearing surface of the magnetic head slider near the leading side as viewed in the moving direction 37A of the magnetic head slider (or disc). This layout is represented by "1" in the column labeled as "Number of pads" in Table 1. In Embodiments 75 and 76, two contact pads are provided. In Embodiment 75, two contact pads are aligned in parallel with the moving direction 37A of the magnetic disc, as shown in FIG. 7. This layout is represented by "2(P)" in the column labeled as "Number of pads". In Embodiment 76, two contact pads are aligned in a direction perpendicular to the moving direction 37A of the magnetic head slider, as shown in FIG. 8. This layout is represented by "2(V)" in the column labeled as "Number of pads".

In Embodiments 77 and 78, three contact pads are provided. In Embodiment 77, two of the three contact pads are provided near the leading side of the bearing surface as viewed in the moving direction 37A such that the two are aligned in the direction perpendicular to the moving direction 37A, while the remaining one is provided near the trailing side, as shown in FIG. 9. This layout is represented by "3(F)" in the column labeled as "Number of pads". In Embodiment 78, a single contact pad is provided near the leading side while the remaining two contact pads are provided near the trailing side such that they are aligned in the direction perpendicular to the moving direction 37A, as shown in FIG. 10. This layout is represented by "3(B)" in the column labeled as "Number of pads".

Embodiments 1–78 are operated over a rotating magnetic disc 6 with a contact pad or pads 4 which contact the magnetic disc 6, as shown in FIG. 1. At this time, a load of 50 mgf was applied to the magnetic head slider 2 against the magnetic disc 6 by bending the supporting member 3 supporting the magnetic head slider 2.

The jumping amount of the magnetic head slider 2 was measured during sliding operation of the magnetic head slider on the magnetic disc 6 at a speed of 20 m/sec. The results of the measurement are shown in Table 1.

The jumping amount was measured using a laser Doppler vibration meter (hereinafter referred to as "LDV"). A laser beam was irradiated onto the back surface of the magnetic head slider 2, and variations in the frequency of reflected light were observed to measure the speed. The speed was integrated to obtain the amount of displacement of the magnetic head slider relative to the magnetic disc.

Two LDV were used to measure the amount of displacement of the back surface of the magnetic head slider 2 at respective positions thereon. From the measurement, roll angle and pitch angle were obtained.

In Comparative Examples 1 and 2, a single contact pad having a smoothed pad surface is provided similarly to Embodiments 1–74 (see FIG. 6). Instead of the liquid having two or more polar groups in the molecule, an inorganic (non-polar) compound (300) was used in Comparative Example 1, and an organic compound (315) which contains molecules each having a single polar group was used in Comparative Example 2.

The jumping amount of Comparative Examples 1 and 2 was measured during sliding on the magnetic disc at a speed of 20 m/sec. The results of the measurement are also shown for comparison in Table 1.

Embodiment 1. Also, when Embodiments 75 and 76 each having two contact pads were compared to Embodiments 77 and 78 each having three contact pads, it was found that improved results were obtained in terms of the jumping amount in Embodiments 77 and 78 compared to Embodiments 75 and 76.

Each of Embodiments 79–172 according to the second aspect of the present invention had a contact pad or pads each having a roughed surface.

The method for providing a roughed surface on each contact pad will be described with reference to FIG. 5.

A sintered body of alumina and titanium carbide was used as the material of the contact pad 4. The contact pad 4 was

TABLE I

| EMB. | SURFACE | NUMBER | LIQUID | JUMPING AMOUNT | EMB. | SURFACE | NUMBER | LIQUID | JUMPING AMOUNT |
|---|---|---|---|---|---|---|---|---|---|
| 1 | SMOOTHED | 1 | TWO-POLAR (1) | 10 nm | 40 | SMOOTHED | 1 | TWO-POLAR (40) | 15 nm |
| 2 | SMOOTHED | 1 | TWO-POLAR (2) | 12 | 41 | SMOOTHED | 1 | TWO-POLAR (41) | 16 |
| 3 | SMOOTHED | 1 | TWO-POLAR (3) | 10 | 42 | SMOOTHED | 1 | TWO-POLAR (42) | 16 |
| 4 | SMOOTHED | 1 | TWO-POLAR (4) | 9 | 43 | SMOOTHED | 1 | TWO-POLAR (43) | 15 |
| 5 | SMOOTHED | 1 | TWO-POLAR (5) | 11 | 44 | SMOOTHED | 1 | TWO-POLAR (44) | 12 |
| 6 | SMOOTHED | 1 | TWO-POLAR (6) | 9 | 45 | SMOOTHED | 1 | TWO-POLAR (45) | 12 |
| 7 | SMOOTHED | 1 | TWO-POLAR (7) | 13 | 46 | SMOOTHED | 1 | TWO-POLAR (46) | 8 |
| 8 | SMOOTHED | 1 | TWO-POLAR (8) | 5 | 47 | SMOOTHED | 1 | TWO-POLAR (47) | 8 |
| 9 | SMOOTHED | 1 | TWO-POLAR (9) | 5 | 48 | SMOOTHED | i | TWO-POLAR (48) | 8 |
| 10 | SMOOTHED | 1 | TWO-POLAR (10) | 10 | 49 | SMOOTHED | 1 | TWO-POLAR (49) | 8 |
| 11 | SMOOTHED | 1 | TWO-POLAR (11) | 8 | 50 | SMOOTHED | 1 | TWO-POLAR (50) | 4 |
| 12 | SMOOTHED | 1 | TWO-POLAR (12) | 9 | 51 | SMOOTHED | 1 | TWO-POLAR (51) | 9 |
| 13 | SMOOTHED | 1 | TWO-POLAR (13) | 9 | 52 | SMOOTHED | 1 | TWO-POLAR (100) | 10 |
| 14 | SMOOTHED | 1 | TWO-POLAR (14) | 8 | 53 | SMOOTHED | 1 | TWO-POLAR (101) | 10 |
| 15 | SMOOTHED | 1 | TWO-POLAR (15) | 17 | 54 | SMOOTHED | 1 | TWO-POLAR (102) | 10 |
| 16 | SMOOTHED | 1 | TWO-POLAR (16) | 16 | 55 | SMOOTHED | 1 | TWO-POLAR (103) | 8 |
| 17 | SMOOTHED | 1 | TWO-POLAR (17) | 15 | 56 | SMOOTHED | 1 | TWO-POLAR (104) | 12 |
| 18 | SMOOTHED | 1 | TWO-POLAR (18) | 16 | 57 | SMOOTHED | 1 | TWO-POLAR (105) | 10 |
| 19 | SMOOTHED | 1 | TWO-POLAR (19) | 16 | 58 | SMOOTHED | 1 | TWO-POLAR (106) | 13 |
| 20 | SMOOTHED | 1 | TWO-POLAR (20) | 14 | 59 | SMOOTHED | 1 | TWO-POLAR (107) | 15 |
| 21 | SMOOTHED | 1 | TWO-POLAR (21) | 19 | 60 | SMOOTHED | 1 | TWO-POLAR (108) | 7 |
| 22 | SMOOTHED | 1 | TWO-POLAR (22) | 18 | 61 | SMOOTHED | 1 | TWO-POLAR (109) | 8 |
| 23 | SMOOTHED | 1 | TWO-POLAR (23) | 14 | 62 | SMOOTHED | 1 | TWO-POLAR (110) | 9 |
| 24 | SMOOTHED | 1 | TWO-POLAR (24) | 16 | 63 | SMOOTHED | 1 | TWO-POLAR (111) | 8 |
| 25 | SMOOTHED | 1 | TWO-POLAR (25) | 15 | 64 | SMOOTHED | 1 | TWO-POLAR (112) | 8 |
| 26 | SMOOTHED | 1 | TWO-POLAR (26) | 14 | 65 | SMOOTHED | 1 | TWO-POLAR (113) | 8 |
| 27 | SMOOTHED | 1 | TWO-POLAR (27) | 16 | 66 | SMOOTHED | 1 | TWO-POLAR (114) | 10 |
| 28 | SMOOTHED | 1 | TWO-POLAR (28) | 16 | 67 | SMOOTHED | 1 | TWO-POLAR (115) | 13 |
| 29 | SMOOTHED | 1 | TWO-POLAR (29) | 16 | 68 | SMOOTHED | 1 | TWO-POLAR (116) | 12 |
| 30 | SMOOTHED | 1 | TWO-POLAR (30) | 15 | 69 | SMOOTHED | 1 | TWO-POLAR (117) | 7 |
| 31 | SMOOTHED | 1 | TWO-POLAR (31) | 17 | 70 | SMOOTHED | 1 | TWO-POLAR (200) | 15 |
| 32 | SMOOTHED | 1 | TWO-POLAR (32) | 16 | 71 | SMOOTHED | 1 | TWO-POLAR (201) | 15 |
| 33 | SMOOTHED | 1 | TWO-POLAR (33) | 13 | 72 | SMOOTHED | 1 | TWO-POLAR (202) | 18 |
| 34 | SMOOTHED | 1 | TWO-POLAR (34) | 14 | 73 | SMOOTHED | 1 | TWO-POLAR (203) | 17 |
| 35 | SMOOTHED | 1 | TWO-POLAR (35) | 14 | 74 | SMOOTHED | 1 | TWO-POLAR (204) | 15 |
| 36 | SMOOTHED | 1 | TWO-POLAR (36) | 13 | 75 | SMOOTHED | 2 (P) | TWO-POLAR (1) | 8 |
| 37 | SMOOTHED | 1 | TWO-POLAR (37) | 13 | 76 | SMOOTHED | 2 (V) | TWO-POLAR (1) | 8 |
| 38 | SMOOTHED | 1 | TWO-POLAR (38) | 14 | 77 | SMOOTHED | 3 (F) | TWO-POLAR (1) | 7 |
| 39 | SMOOTHED | 1 | TWO-POLAR (39) | 15 | 78 | SMOOTHED | 3 (B) | TWO-POLAR (1) | 7 |
|  |  |  |  |  | COMP. EX. 1 | SMOOTHED | 1 | NON-POLAR (300) | 50 |
|  |  |  |  |  | COMP. EX. 2 | SMOOTHED | 1 | ONE-POLAR (315) | 45 |

It is apparent from Table 1 that each of Embodiments 1–78, in which a single contact pad having a smoothed pad surface was provided on the bearing surface of the magnetic head slider and a liquid having two or more polar groups in the molecules was used, provided greatly decreased jumping amount as compared to that of Comparative Examples 1 and 2, in each of which non-polar liquid (300) or one polar group liquid (315) was provided.

When Embodiment 1, in which compound (1) having two polar groups was used and a single contact pad was provided, was compared to each of Embodiments 75–78 in which compound (1) having two polar groups was used but the number of the contact pads was two or three, it was found that improved results were obtained in terms of the jumping amount in Embodiments 75–78 compared to ground to obtain a spherical surface having a maximal surface roughness Rmax of about 0.2 nm, and then subjected to ion etching using oxygen ions.

During the etching process, particles of titanium carbide were etched selectively from the alumina so that convex portions 19 composed of alumina and flat portions (concave portions) 18 were formed. The amount of projection of each convex portion 19 from the flat portions 18 was about 2 nm.

Embodiments 79–172 are similar to Embodiments 1–78 except that a contact pad or pads each having a roughed surface were provided in Embodiments 79–172.

In Embodiments 79–168, a single contact pad 4 having a roughed surface was provided on the bearing surface of the magnetic head slider 2 near the leading side thereof as viewed in the moving direction 37A of the magnetic disc.

This layout is represented by "1" in the column labeled as "Number of pads" in Table 2.

Each of Embodiments 169 and 170 had two contact pads each having a roughed surface. In Embodiment 169, two contact pads are aligned parallel to the moving direction 37A of the magnetic disc, as shown in FIG. 7. This layout is represented by "2(P)" in the column labeled as "Number of pads". In Embodiment 170, two contact pads are aligned in a direction perpendicular to the moving direction 37A of the magnetic disc, as shown in FIG. 8. This layout is represented by "2(V)" in the column labeled as "Number of pads".

Each of Embodiments 171 and 172 had three contact pads each having a roughed surface. In Embodiment 171, two of the three contact pads are provided near the leading side thereof in the moving direction of the magnetic head slider such that they are aligned perpendicularly to the moving direction, while the remaining one is provided near the trailing side, as shown in FIG. 9. This layout is represented by "3(F)" in the column labeled as "Number of pads". In Embodiment 172, one contact pad is provided near the leading side thereof while the remaining two contact pads are provided near the trailing side such that they are aligned perpendicularly to the moving direction, as shown in FIG. 10. This layout is represented by "3(B)" in the column labeled as "Number of pads".

As shown in Table 2, Embodiments 79–152 had compounds (1)–(51), (100)–(117), and (200)–(204) as liquid molecules each having two or more polar groups for forming liquid film between the contact pad or pads and the magnetic disc. Embodiments 153–162 had compounds (300)–(309) as liquid molecules having non-polar groups and compounds (310)–(315) as liquid molecules each having a single polar group. Embodiments 169–172 had compound (1) as a liquid molecules having two polar groups.

TABLE II

| EMB. | SURFACE | NUMBER | LIQUID | JUMPING AMOUNT | EMB. | SURFACE | NUMBER | LIQUID | JUMPING AMOUNT |
|---|---|---|---|---|---|---|---|---|---|
| 79 | ROUGHED | 1 | TWO-POLAR (1) | 7 nm | 126 | ROUGHED | 1 | TWO-POLAR (48) | 6 nm |
| 80 | ROUGHED | 1 | TWO-POLAR (2) | 9 | 127 | ROUGHED | 1 | TWO-POLAR (49) | 5 |
| 81 | ROUGHED | 1 | TWO-POLAR (3) | 8 | 128 | ROUGHED | 1 | TWO-POLAR (50) | 3 |
| 82 | ROUGHED | 1 | TWO-POLAR (4) | 7 | 129 | ROUGHED | 1 | TWO-POLAR (51) | 8 |
| 83 | ROUGHED | 1 | TWO-POLAR (5) | 9 | 130 | ROUGHED | 1 | TWO-POLAR (100) | 8 |
| 84 | ROUGHED | 1 | TWO-POLAR (6) | 7 | 131 | ROUGHED | 1 | TWO-POLAR (101) | 9 |
| 85 | ROUGHED | 1 | TWO-POLAR (7) | 10 | 132 | ROUGHED | 1 | TWO-POLAR (102) | 8 |
| 86 | ROUGHED | 1 | TWO-POLAR (8) | 4 | 133 | ROUGHED | 1 | TWO-POLAR (103) | 6 |
| 87 | ROUGHED | 1 | TWO-POLAR (9) | 3 | 134 | ROUGHED | 1 | TWO-POLAR (104) | 10 |
| 88 | ROUGHED | 1 | TWO-POLAR (10) | 8 | 135 | ROUGHED | 1 | TWO-POLAR (105) | 11 |
| 89 | ROUGHED | 1 | TWO-POLAR (11) | 7 | 136 | ROUGHED | 1 | TWO-POLAR (106) | 11 |
| 90 | ROUGHED | 1 | TWO-POLAR (12) | 7 | 137 | ROUGHED | 1 | TWO-POLAR (107) | 12 |
| 91 | ROUGHED | 1 | TWO-POLAR (13) | 7 | 138 | ROUGHED | 1 | TWO-POLAR (108) | 5 |
| 92 | ROUGHED | 1 | TWO-POLAR (14) | 6 | 139 | ROUGHED | 1 | TWO-POLAR (109) | 6 |
| 93 | ROUGHED | 1 | TWO-POLAR (15) | 15 | 140 | ROUGHED | 1 | TWO-POLAR (110) | 7 |
| 94 | ROUGHED | 1 | TWO-POLAR (16) | 14 | 141 | ROUGHED | 1 | TWO-POLAR (111) | 7 |
| 95 | ROUGHED | 1 | TWO-POLAR (17) | 13 | 142 | ROUGHED | 1 | TWO-POLAR (112) | 5 |
| 96 | ROUGHED | 1 | TWO-POLAR (18) | 13 | 143 | ROUGHED | 1 | TWO-POLAR (113) | 7 |
| 97 | ROUGHED | 1 | TWO-POLAR (19) | 13 | 144 | ROUGHED | 1 | TWO-POLAR (114) | 9 |
| 98 | ROUGHED | 1 | TWO-POLAR (20) | 11 | 145 | ROUGHED | 1 | TWO-POLAR (115) | 10 |
| 99 | ROUGHED | 1 | TWO-POLAR (21) | 15 | 146 | ROUGHED | 1 | TWO-POLAR (116) | 11 |
| 100 | ROUGHED | 1 | TWO-POLAR (22) | 15 | 147 | ROUGHED | 1 | TWO-POLAR (117) | 5 |
| 101 | ROUGHED | 1 | TWO-POLAR (23) | 12 | 148 | ROUGHED | 1 | TWO-POLAR (200) | 13 |
| 102 | ROUGHED | 1 | TWO-POLAR (24) | 14 | 149 | ROUGHED | 1 | TWO-POLAR (201) | 12 |
| 103 | ROUGHED | 1 | TWO-POLAR (25) | 12 | 150 | ROUGHED | 1 | TWO-POLAR (202) | 15 |
| 104 | ROUGHED | 1 | TWO-POLAR (26) | 10 | 151 | ROUGHED | 1 | TWO-POLAR (203) | 14 |
| 105 | ROUGHED | 1 | TWO-POLAR (27) | 14 | 152 | ROUGHED | 1 | TWO-POLAR (204) | 13 |
| 106 | ROUGHED | 1 | TWO-POLAR (28) | 14 | 153 | ROUGHED | 1 | NON-POLAR (300) | 14 |
| 107 | ROUGHED | 1 | TWO-POLAR (29) | 13 | 154 | ROUGHED | 1 | NON-POLAR (301) | 14 |
| 108 | ROUGHED | 1 | TWO-POLAR (30) | 13 | 155 | ROUGHED | 1 | NON-POLAR (302) | 15 |
| 109 | ROUGHED | 1 | TWO-POLAR (31) | 14 | 156 | ROUGHED | 1 | NON-POLAR (303) | 16 |
| 110 | ROUGHED | 1 | TWO-POLAR (32) | 13 | 157 | ROUGHED | 1 | NON-POLAR (304) | 15 |
| 111 | ROUGHED | 1 | TWO-POLAR (33) | 10 | 158 | ROUGHED | 1 | NON-POLAR (305) | 15 |
| 112 | ROUGHED | 1 | TWO-POLAR (34) | 11 | 159 | ROUGHED | 1 | NON-POLAR (306) | 14 |
| 113 | ROUGHED | 1 | TWO-POLAR (35) | 11 | 160 | ROUGHED | 1 | NON-POLAR (307) | 14 |
| 114 | ROUGHED | 1 | TWO-POLAR (36) | 10 | 161 | ROUGHED | 1 | NON-POLAR (308) | 10 |
| 115 | ROUGHED | 1 | TWO-POLAR (37) | 10 | 162 | ROUGHED | 1 | NON-POLAR (309) | 10 |
| 116 | ROUGHED | 1 | TWO-POLAR (38) | 10 | 163 | ROUGHED | 1 | ONE-POLAR (310) | 11 |
| 117 | ROUGHED | 1 | TWO-POLAR (39) | 12 | 164 | ROUGHED | 1 | ONE-POLAR (311) | 11 |
| 118 | ROUGHED | 1 | TWO-POLAR (40) | 13 | 165 | ROUGHED | 1 | ONE-POLAR (312) | 12 |
| 119 | ROUGHED | 1 | TWO-POLAR (41) | 13 | 166 | ROUGHED | 1 | ONE-POLAR (313) | 12 |
| 120 | ROUGHED | 1 | TWO-POLAR (42) | 14 | 167 | ROUGHED | 1 | ONE-POLAR (314) | 11 |
| 121 | ROUGHED | 1 | TWO-POLAR (43) | 12 | 168 | ROUGHED | 1 | ONE-POLAR (315) | 11 |
| 122 | ROUGHED | 1 | TWO-POLAR (44) | 10 | 169 | ROUGHED | 2 (P) | TWO-POLAR (1) | 6 |
| 123 | ROUGHED | 1 | TWO-POLAR (45) | 11 | 170 | ROUGHED | 2 (V) | TWO-POLAR (1) | 6 |
| 124 | ROUGHED | 1 | TWO-POLAR (46) | 6 | 171 | ROUGHED | 3 (F) | TWO-POLAR (1) | 5 |
| 125 | ROUGHED | 1 | TWO-POLAR (47) | 6 | 172 | ROUGHED | 3 (B) | TWO-POLAR (1) | 5 |

When Embodiment 79, in which compound (1) having two polar groups was used and a single contact pad having a roughed surface was provided, was compared to each of Embodiments 169–172, in which compound (1) having two polar groups was used but the number of the contact pads was two or three, it was found that improved results were obtained in terms of jumping amount in Embodiments 169–172 compared to Embodiment 79.

Also, when Embodiments 169 and 170 each having two contact pads were compared to Embodiments 171 and 172 each having three contact pads, it was found that improved results were obtained in terms of jumping amount in Embodiments 171 and 172 compared to Embodiments 169 and 170.

When the jumping amount is considered with each kind of liquid, it can be found from Table 1 and Table 2 that compounds (200)–(204), (300)–(307) and (310)–(315) which are hydrocarbons containing fluorine (F) provide slightly larger jumping amount compared to compounds (100)–(117) and (308) containing silicone compounds and compounds (1)–(51) containing hydrocarbons. It is considered that such a difference is produced because the surface tension is small in those Embodiments as compared to the case where hydrocarbon compounds are used. For example, the surface tensions of compounds (1), (200) and (100) are 50.2 dyne/cm, 17.2 dyne/cm, and 21.02 dyne/cm, respectively.

It has been found that the contact pads having roughed surfaces can reduce the jumping amount more effectively compared to contact pads having smoothed surfaces. It is considered that such a difference is produced because the attractive force of liquid film expressed by expression (2) ($F=(A\lambda \cdot \cos \theta)/h$) increases at the flat portions.

Next, the functions and advantages of the magnetic disc drive according to the present invention will be described in detail with reference to FIGS. 13–16.

FIG. 13 is a graph for showing the relationship between the load (mgf) acting on the magnetic head slider against the magnetic disc and the jumping amount (nm) in the case where a liquid film exists (shown by a curve defined by open circle signs) and in the case where no liquid film exists (show by a curve defined by closed circle signs). FIG. 10 demonstrates that when a liquid film exists, the jumping amount decreases as the load decreases. In contrast, when a liquid film does not exist, the jumping amount increases as the load decreases.

It can be understood from FIG. 13, the difference in the jumping amount of the magnetic head slider between the case in which a liquid film exists and the case in which a liquid film does not exist increases as the load decreases.

Although the effect of the liquid film could not be found in a conventional load level (higher than about $5 \times 10^2$ mgf), it was found that a remarkable effect can be obtained in a light load range in which the load is about 500 mgf or less. From this fact, it is understood that supporting the magnetic head slider such that a light load equal to or less than 500 mgf (preferably, equal to or less than 100 mgf, and more preferably, equal to or less than 50 mf) exists between the slider and the disc effectively prevents the magnetic head slider from jumping in the magnetic disc drives of the first and second aspects of the present inventions.

Figure 14:
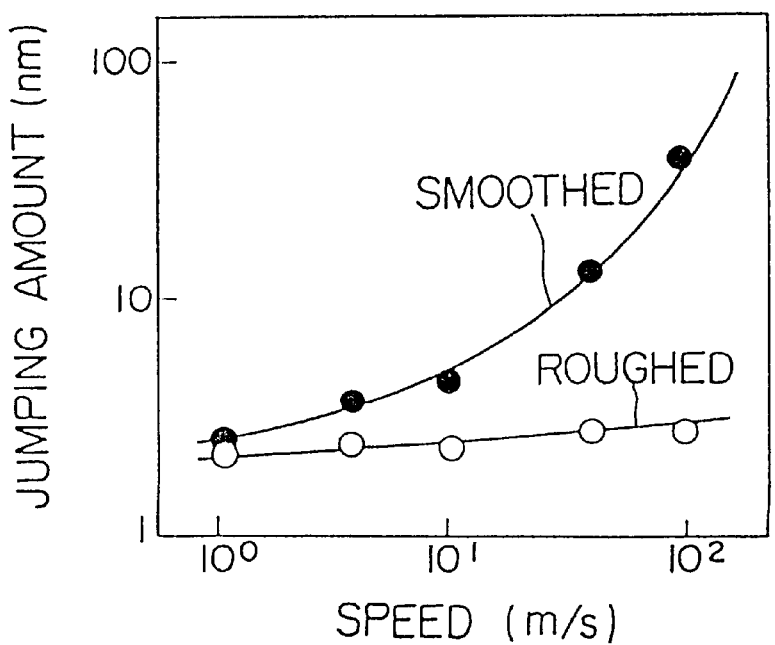
FIG. 14 is a graph showing the relationship between the speed of the magnetic head slider and the jumping amount thereof.

FIG. 14 is a graph for showing the relationship between the speed of the magnetic head slider and the jumping amount thereof (dependency of the amount of jumping on the speed) in the case where smoothed contact pads are used (defined by closed circle signs, specifically, in Embodiment 9 according to the first aspect of the present invention) and in the case where contact pads having roughed surfaces are used (defind by open circle signs, specifically, in Embodiment 87 according to the second aspect of the present invention).

FIG. 14 demonstrates that the jumping amount increases as the speed increases in both cases, and that the rate of increase is very large in the case of contact pads having smoothed surfaces being used but is small in the case of contact pads having roughed surfaces being used. From this fact, it can be said that the magnetic disc drive of the second aspect of the present invention in which contact pads having roughed surfaces are provided is superior to the magnetic disc drive in which contact pads having smoothed surfaces are used.

FIG. 15 is a graph for showing the relationship between the speed of the magnetic head slider and the roll angle thereof in the magnetic disc drive according to the second invention in which the magnetic head slider has one to three pads each having a roughed surface. Curves dotted by signs of solid circles, open triangles, open circles, solid triangles and open squares represent the cases of a single pad in Embodiment 79 as shown in FIG. 6, two pads of layout (2(P)) in Embodiment 169 as shown in FIG. 7, two pads of layout (2(V)) in Embodiment 170 as shown in FIG. 8, three pads of layout (3(B)) in Embodiment 172 as shown in FIG. 10, and three pads of layout (3(F)) in Embodiment 171 as shown in FIG. 9, respectively.

As is apparent from FIG. 15, the jumping amount increases as the speed increases in the magnetic head slider which has one pad or two pads of layout (2(P)). However, the dependency of the jumping amount on speed cannot be observed in the magnetic head slider which has three pads of layout (3(B)) or two pads of layout (2(V)).

If three pads of layout (3(F)) are provided, the jumping amount does not substantially depend on the speed, similar to the two pads of layout (3(B)), at the speed level equal to or less than 10 m/sec, but increases at the speed level exceeding 10 m/sec. It is considered that this phenomenon occurs because the layout (3(B)) is scarcely affected by dynamic pressure of air, whereas the layout (3(F)) is readily affected by dynamic pressure of air.

Figure 16:
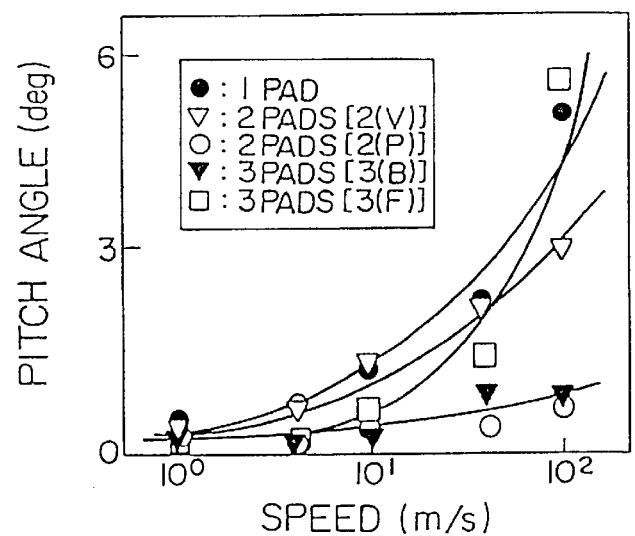
FIG. 16 is a graph showing the relationship between the speed of the magnetic head slider and the pitch angle thereof.

FIG. 16 is a graph for showing dependency of pitch angle of the magnetic head slider on the speed thereof in Embodiments 79, 169 [2(P)], 170 [2(V)], 171 [3(F)], and 172 [3(B)] which are also shown in FIG. 12.

It can be understood from FIG. 16 that although the jumping amount increases as the speed increases in the magnetic head slider which has one pad or two pads of layout 2(V), dependency of the jumping amount on the speed cannot be observed in the magnetic head slider which has three pads of layout (3(B)) or two pad of layout (2(P)).

As is the case for the roll angle, if three pads of layout (3(F)) are provided, the jumping amount due to the pitch angle does not depend on the speed similar to the case of layout (3(B)) at a speed level equal to or less than 10 m/sec, but rapidly increases at the speed level exceeding 10 m/sec. It is considered that this phenomenon occurs because three pad slider of layout (3(B)) is scarcely affected by dynamic pressure of air whereas the three pad slider of layout (3(F)) are affected by dynamic pressure of air.

When both the roll angle (FIG. 15) and pitch angle (FIG. 16) are considered, the traveling stability (which may be a sum of the inverse of the pitch angle plus the inverse of the roll angle) of the respective magnetic head sliders can be ranked as follows:

at a speed equal to or lower than 10 m/sec, three pad sliders of layouts (3(B)) and (3(F)) are superior to the two pad slider of layout (2(P)), which is similar to two the pad slider of layout (2(V)), which is superior to the one pad slider; and at a speed greater than 10 m/sec, three pad slider of layout (3(B)) is superior to the two pad slider of layout (2(P)), which is similar to the two pad slider of layout (2(V)), which is superior to the three pad slider of layout (3(F)), which is superior to the one pad slider.

Results similar to those shown in FIGS. 15 and 16 were obtained in Embodiment 1 (single pad), Embodiment 75 (2(P)), Embodiment 76 (2(V)), Embodiment 77 (3(F)), and Embodiment 78 (3(B)) according to the first aspect of the present invention in which compound (1) having two polar groups in a liquid molecule was used, and contact pads having smoothed surfaces were provided.

Figure 17:
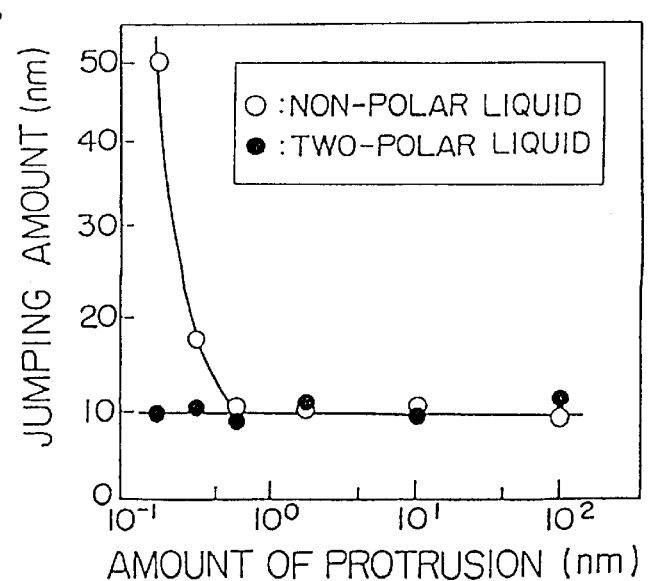
FIG. 17 is a graph showing the relationship between the surface roughness (amount of protrusion of the convex portion from the flat portion) of a contact pad and the jumping amount of the magnetic head slider.

FIG. 17 is a graph for showing the relationship between the jumping amount and the amount of projection (corresponding to maximum surface roughness Rmax) of the convex portion from the flat portion of a contact pad, which is obtained in the embodiment having a non-polar liquid compound (308) (open sign) and in Embodiment 79 having compound (1) having two polar groups in the molecule (closed sign).

FIG. 17 demonstrates that a non-polar liquid provides a profile of the jumping amount sharply increasing as the maximum roughness Rmax decreases down to a level lower than 0.6 nm.

Thus, it is preferred that the maximum surface roughness Rmax of each contact pad be equal to or greater than 0.6 nm.

If a liquid having two or more polar groups in the molecule is used, the intermolecular force acts between the magnetic disc and the contact pads at portions other than the contacting portion (for example, in an area surrounding the contacting portion). Therefore, the jumping amount does not depend on the distance between the convex portion and the concave portion.

As described above, in the magnetic disc drive according to the present invention, the jumping amount can be decreased down to one part in a few through several tens, and the stability can be increased up to a few times, both compared to the conventional magnetic disc drive. The recording density was increased up to 5 times that of a conventional magnetic disc drive by using the magnetic disc drive system of the present invention.

Since above embodiments are described only for examples, the present invention is not limited to such embodiments and it will be obvious for those skilled in the art that various modifications or alterations can be easily made based on the above embodiments within the scope of the present invention.

What is claimed is:

1. A magnetic disc drive system comprising a magnetic disc, a read/write head for reading/writing information from and to said magnetic disc, a magnetic head slider, having a bearing surface, for mounting said read/write head, a supporting member for supporting said magnetic head slider such that a load not more than 500 milligram-weight acts between said magnetic head slider and said magnetic disc, said magnetic head slider having at least one contact pad on said bearing surface, said contact pad having two convex portions separated by a flat portion and aligned in a direction perpendicular to the movement of said magnetic head slider with respect to said magnetic disk, and coupled to said magnetic disc by means of a liquid lubricating agent which forms a liquid film between said contact pad and said magnetic disc, said liquid lubricating agent comprising a molecule having a main chain between two ends, and having at least two polar groups at both ends of each molecule chain and wherein said liquid lubricating agent provides a molecular force on said slider for preventing jumping of said slider relative to said disc.

2. A magnetic disc drive system as defined in claim 1 wherein said at least one contact pad includes first, second and third convex contact portions separated by flat portions, said first and second contact portions being disposed in the vicinity of a leading side of said bearing surface and aligned in a direction perpendicular to the movement of said magnetic head slider with respect to said magnetic disc, said third contact portion being disposed in the vicinity of a trailing side of said bearing surface.

3. A magnetic disc drive system as defined in claim 1 wherein said at least one contact pad includes first, second and third convex contact portions separated by flat portions, said first contact portion being disposed in the vicinity of a leading side of said bearing surface, said second and third contact portions being disposed in the vicinity of a trailing side of said bearing surface and aligned in a direction perpendicular to the movement of said magnetic head slider with respect to said magnetic disc.

4. A magnetic disc drive system comprising a magnetic disc, a read/write head for reading/writing information from and to said magnetic disc file, a magnetic head slider, having a bearing surface, for mounting said read/write head, a supporting member for supporting said magnetic head slider such that a load not more than 500 milligram-weight acts between said magnetic head slider and said magnetic disc, said magnetic head slider having at least one contact pad on said bearing surface, said contact pad having a flat portion and two convex portions separated by said flat portion and aligned in a direction perpendicular to the movement of said magnetic head slider with respect to said magnetic disc, said contact pad having a smooth surface which is coupled to said magnetic disc by means of a liquid lubricating agent which forms a liquid film between said contact pad and said magnetic disc, and said liquid comprises a molecule having a main chain between two ends, and includes a plurality of polar groups in each molecule of said liquid including at least two polar groups at both ends of each molecule chain so as to provide on said slider a molecular force for preventing jumping of said slider relative to said disc.

5. A magnetic disc drive system as defined in claim 4 wherein said at least one contact pad includes first, second and third convex contact portions separated by flat portions, said first and second contact portions being disposed in the vicinity of a leading side of said bearing surface and aligned in a direction perpendicular to the movement of said magnetic head slider with respect to said magnetic disc, said third contact portion being disposed in the vicinity of a trailing side bearing surface.

6. A magnetic disc drive system as defined in claim 4 wherein said at least one contact pad includes first, second and third convex contact portions separated by flat portions, said first contact portions being disposed in the vicinity of a leading side of said bearing surface, said second and third contact portions being disposed at a trailing side of said bearing surface and aligned in a direction perpendicular to the movement of said magnetic head slider with respect to said magnetic disc.

7. A magnetic disc drive system comprising a magnetic disc, a read/write head for reacting/writing information from and to said magnetic disc, a magnetic head slider, having a bearing surface, for mounting said read/write head, a supporting member for supporting said magnetic head slider such that a load not more than 500 milligram-weight acts between said magnetic head slider and said magnetic disc, said magnetic head slider having at least one contact pad on said bearing surface, said contact pad having a roughed surface which is coupled to said magnetic disc by means of a liquid lubricating agent which forms a liquid film between said contact pad and said magnetic disc, said at least one contact pad including two convex contact portions separated by a flat portion and aligned in a direction perpendicular to the movement of said magnetic head slider with respect to said magnetic disc, and said liquid lubricating agent comprising a molecule having a main chain between two ends, and having at least two polar groups at both ends of each molecule chain, wherein said liquid lubricating agent provides a molecular force on said slider for preventing jumping of said slider relative to said disc.

8. A magnetic disc drive system comprising a magnetic disc, a read/write head for reading/writing information from and to said magnetic disc, a magnetic head slider, having a bearing surface, for mounting said read/write head, a supporting member for supporting said magnetic head slider such that a load not more than 500 milligram-weight acts between said magnetic head slider and said magnetic disc, said magnetic head slider having at least one contact pad on said bearing surface, said contact pad having a roughed surface which is coupled to said magnetic disc by means of a liquid lubricating agent which forms a liquid film between said contact pad and said magnetic disc, said at least one contact pad including first, second and third convex contact portions separated by flat portions, said first and second contact portions being disposed in the vicinity of a leading side of said bearing surface and aligned in a direction perpendicular to the movement of said magnetic head slider with respect to said magnetic disc, said third contact portion being disposed in the vicinity of a trailing side of said bearing surface, and said liquid lubricating agent comprising a molecule having a main chain between two ends, and having at least two polar groups at both ends of each molecule chain, wherein said liquid lubricating agent provides a molecular force on said slider for preventing jumping of said slider relative to said disc.

9. A magnetic disc drive system comprising a magnetic disc, a read/write head for reading/writing information from and to said magnetic disc, a magnetic head slider, having a bearing surface, for mounting said read/write head, a supporting member for supporting said magnetic head slider such that a load not more than 500 milligram-weight acts between said magnetic head slider and said magnetic disc, said magnetic head slider having at least one contact pad on said bearing surface, said contact pad having a roughed surface which is coupled to said magnetic disc by means of a liquid lubricating agent which forms a liquid film between said contact pad and said magnetic disc, said at least one contact pad including first, second and third convex contact portions separated by flat portions, said first contact portion being disposed in the vicinity of a leading side of said bearing surface, said second and third contact portions being disposed in the vicinity of a trailing side of said bearing surface and aligned in a direction perpendicular to the movement of said magnetic head slider with respect to said magnetic disc, and said liquid lubricating agent comprising a molecule having a main chain between two ends, and having at least two polar groups at both ends of each molecule chain, and wherein said liquid lubricating agent provides a molecular force on said slider for preventing jumping of said slider relative to said disc.

10. A magnetic disc drive system comprising a magnetic disc, a read/write head for reading/writing information from and to said magnetic disc file, a magnetic head slider, having a bearing surface, for mounting said read/write head, a supporting member for supporting said magnetic head slider such that a load not more than 500 milligram-weight acts between said magnetic head slider and said magnetic disc, said magnetic head slider having at least one contact pad on said bearing surface, said contact pad having a flat portion and a plurality of convex portions protruding from said flat portion, said contact pad having a roughed surface which is coupled to said magnetic disc by means of a liquid lubricating agent which forms a liquid film between said contact pad and said magnetic disc, said at least one contact pad including two convex contact portions separated by a flat portion and aligned in a direction perpendicular to the movement of said magnetic head slider with respect to said magnetic disc, and said liquid comprises a molecule having a main chain between two ends, and includes a plurality of polar groups in each molecule of said liquid including at least two polar groups at both ends of each molecule chain so as to provide on said slider a molecular force for preventing jumping of said slider relative to said disc.

11. A magnetic disc drive system comprising a magnetic disc, a read/write head for reading/writing information from and to said magnetic disc file, a magnetic head slider, having a bearing surface, for mounting said read/write head, a supporting member for supporting said magnetic head slider such that a load not more than 500 milligram-weight acts between said magnetic head slider and said magnetic disc, said magnetic head slider having at least one contact pad on said bearing surface, said contact pad having a flat portion and a plurality of convex portions protruding from said flat portion, said contact pad having a roughed surface which is coupled to said magnetic disc by means of a liquid lubricating agent which forms a liquid film between said contact pad and said magnetic disc, said at least one contact pad including first, second and third convex contact portions separated by flat portions, said first and second contact portions being disposed in the vicinity of a leading side of said bearing surface and aligned in a direction perpendicular to the movement of said magnetic head slider with respect to said magnetic disc, said third contact portion being disposed in the vicinity of a trailing side bearing surface, and said liquid comprises a molecule having a main chain between two ends, and includes a plurality of polar groups in each molecule of said liquid including at least two polar groups at both ends of each molecule chain so as to provide on said slider a molecular force for preventing jumping of said slider relative to said disc.

12. A magnetic disc drive system comprising a magnetic disc, a read/write head for reading/writing information from and to said magnetic disc file, a magnetic head slider, having a bearing surface, for mounting said read/write head, a supporting member for supporting said magnetic head slider such that a load not more than 500 milligram-weight acts between said magnetic head slider and said magnetic disc, said magnetic head slider having at least one contact pad on said bearing surface, said contact pad having a flat portion and a plurality of convex portions protruding from said flat portion, said contact pad having a roughed surface which is coupled to said magnetic disc by means of a liquid lubricating agent which forms a liquid film between said contact pad and said magnetic disc, said at least one contact pad including first, second and third convex contact portions separated by flat portions, said first contact portion being disposed in the vicinity of a leading side of said bearing surface, said second and third contact portions being disposed at a trailing side of said bearing surface and aligned in a direction perpendicular to the movement of said magnetic head slider with respect to said magnetic disc, and said liquid comprises a molecule having a main chain between two ends, and includes a plurality of polar groups in each molecule of said liquid including at least two polar groups at both ends of each molecule chain so as to provide on said slider a molecular force for preventing jumping of said slider relative to said disc.

\* \* \* \* \*